United States Patent
Kwon et al.

(10) Patent No.: US 12,286,505 B2
(45) Date of Patent: Apr. 29, 2025

(54) METHOD FOR PRODUCING METALLOCENE-SUPPORTED CATALYST AND METALLOCENE-SUPPORTED CATALYST

(71) Applicant: LG Chem, Ltd., Seoul (KR)

(72) Inventors: Yong Woo Kwon, Daejeon (KR); Ki Soo Lee, Daejeon (KR); Seung Mi Lee, Daejeon (KR); Jung Won Lee, Daejeon (KR); Hyun Jee Kwon, Daejeon (KR); Po Eun Kim, Daejeon (KR); Jae Hoon Choi, Daejeon (KR); Jong Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 723 days.

(21) Appl. No.: 17/619,510

(22) PCT Filed: Oct. 29, 2020

(86) PCT No.: PCT/KR2020/014853
§ 371 (c)(1),
(2) Date: Dec. 15, 2021

(87) PCT Pub. No.: WO2021/086027
PCT Pub. Date: May 6, 2021

(65) Prior Publication Data
US 2022/0267486 A1    Aug. 25, 2022

(30) Foreign Application Priority Data
Nov. 1, 2019    (KR) .................. 10-2019-0138914

(51) Int. Cl.
C08F 4/6592    (2006.01)
C08F 4/659    (2006.01)
(Continued)

(52) U.S. Cl.
CPC ...... *C08F 4/65927* (2013.01); *C08F 4/65912* (2013.01); *C08F 4/65916* (2013.01);
(Continued)

(58) Field of Classification Search
CPC ........ B01J 31/22; B01J 31/16; C08F 4/65927; C08F 4/65912; C08F 4/65916; C08F 210/02; C08F 210/14; C08F 2420/00
(Continued)

(56) References Cited

U.S. PATENT DOCUMENTS

| | | | |
|---|---|---|---|
| 5,064,802 A | 11/1991 | Stevens et al. | |
| 5,329,033 A * | 7/1994 | Spaleck .................. | C08F 10/00 556/11 |

(Continued)

FOREIGN PATENT DOCUMENTS

| | | |
|---|---|---|
| CN | 1211994 A | 3/1999 |
| KR | 19990087169 A | 12/1999 |

(Continued)

OTHER PUBLICATIONS

English translation of Written Opinion for PCT/KR2020/014853. (Year: 2021).*

(Continued)

*Primary Examiner* — Patricia L. Hailey
(74) *Attorney, Agent, or Firm* — Lerner David LLP

(57) ABSTRACT

The present invention relates to: a method for producing a metallocene-supported catalyst, the method including (1) a step of producing a reaction solution 1 by reacting one or more metallocene compounds with one or more co-catalyst compounds, (2) a step of performing supporting by mixing a support with the reaction solution 1, (3) a step of producing a reaction solution 2 by reacting one or more metallocene compounds with one or more co-catalyst compounds, and (4) a step of mixing the reaction solution 2 with the (Continued)

Example 1

Example 2 supporting material of the step (2); and a metallocene-supported catalyst produced by the same.

15 Claims, 10 Drawing Sheets

(51) Int. Cl.
C08F 210/02 (2006.01)
C08F 210/14 (2006.01)
(52) U.S. Cl.
CPC .......... *C08F 210/02* (2013.01); *C08F 210/14* (2013.01); *C08F 2420/00* (2013.01)
(58) Field of Classification Search
USPC .......................................... 502/104, 150, 152
See application file for complete search history.

(56) References Cited

U.S. PATENT DOCUMENTS

| | | | |
|---|---|---|---|
| 5,786,291 A | 7/1998 | Speca et al. | |
| 5,945,553 A * | 8/1999 | Kuber | B01J 31/2295 502/103 |
| 6,410,661 B1 * | 6/2002 | Kaminsky | C07F 17/00 502/103 |
| 6,893,995 B2 * | 5/2005 | Thomas | B01J 37/031 502/103 |
| 9,163,046 B2 | 10/2015 | Voskoboynikov et al. | |
| 2016/0304637 A1 | 10/2016 | Lee et al. | |
| 2019/0135961 A1 | 5/2019 | Joung et al. | |
| 2019/0263942 A1 | 8/2019 | Jeong et al. | |
| 2020/0190238 A1 | 6/2020 | Lee et al. | |

FOREIGN PATENT DOCUMENTS

| | | |
|---|---|---|
| KR | 20150062145 A | 6/2015 |
| KR | 20160084181 A | 7/2016 |
| KR | 101711788 B1 | 3/2017 |
| KR | 101725004 B1 | 4/2017 |
| KR | 101835285 B1 | 3/2018 |
| KR | 20190106796 A | 9/2019 |
| WO | 9731035 A1 | 8/1997 |

OTHER PUBLICATIONS

International Search Report for PCT/KR2020/014853 dated Sep. 2, 2021. 2 pgs.
Extended European Search Report including Written Opinion for Application No. 20881555.5 dated Jul. 25, 2022, pp. 1-9.

* cited by examiner

Example 1

Example 2

Comparative Example 1

Comparative Example 1

Comparative Example 1

METHOD FOR PRODUCING METALLOCENE-SUPPORTED CATALYST AND METALLOCENE-SUPPORTED CATALYST

CROSS-REFERENCE TO RELATED APPLICATIONS

The present application is a national stage entry under 35 U.S.C. § 371 of International Application No. PCT/KR2020/014853 filed on Oct. 29, 2020, which claims priority from Korean Patent Application No. 10-2019-0138914 filed on Nov. 1, 2019, all the disclosures of which are incorporated herein by reference.

TECHNICAL FIELD

The present invention relates to a method for producing a metallocene-supported catalyst and a metallocene-supported catalyst, and specifically, relates to: a method for producing a metallocene-supported catalyst in which supporting processes are divided according to the catalyst residence time of a metallocene compound; and a metallocene-supported catalyst produced by the same.

BACKGROUND ART

In general, an olefin polymer such as an ethylene copolymer is a useful polymer material used as a material for a hollow molded article, an extrusion molded article, a film, a sheet, or the like, and has been produced in the presence of a Ziegler-Natta catalyst system. The Ziegler-Natta catalyst is a heterogeneous catalyst, and is a catalyst used in a system, such as liquid reactant-solid catalyst, in which the phase of a reactant and the phase of a catalyst are not the same. Such a Ziegler-Natta catalyst is composed of two components, and typically includes: a halogen compound (for example, $TiCl_4$) of a transition metal such as titanium (Ti), vanadium (V), chromium (Cr), molybdenum (Mo), and zirconium (Zr); and alkyllithium, alkylaluminum, or the like. However, the Ziegler-Natta catalyst has a disadvantage in that most transition metal atoms could not exhibit the functions thereof because the concentration of active species with respect to a transition metal atom is about a few percent to a few tens of percent, and thus the limitations as a heterogeneous catalyst could not be overcome.

In recent years, as a next-generation catalyst capable of overcoming the disadvantage, metallocene compounds have been attracting attention. The metallocene compounds are homogeneous catalysts containing metals of group 4, and are known to exhibit preferable polymerization activity in olefin polymerization. Most metallocene catalysts used in polymerization use a metal of group 4, such as titanium, zirconium, and hafnium (Hf), and a supporting ligand as a precursor, and include two aromatic five-membered rings, and two halogen compounds as leaving groups. Among them, a supporting ligand coordinated to a central metal is typically an aromatic cyclopentadienyl group.

When a suitable substitution product or a new type of ligand is introduced to the cyclopentadienyl group, which is the above-described supporting ligand, the spatial or electronic environment around the central metal is changed, and accordingly, the properties of the catalyst itself are also changed, and when a polymerization reaction is performed using a zirconocene compound in which an amine group capable of interacting with an organoaluminum compound used as a co-catalyst is substituted, and polyethylene having a bimodal molecular weight distribution can be generated.

Furthermore, by changing the substitution product of the supporting ligand, the molecular weights of polymers to be generated can be controlled. Therefore, a change in the cyclopentadienyl, which is the supporting ligand, may affect polymerization behavior and the physical properties of a polymer to be generated.

The Dow Chemical Company announced [Me2Si(Me4C5)NtBu]TiCl2 (constrained-geometry catalyst, hereinafter, abbreviated as CGC) in the early 1990s (U.S. Pat. No. 5,064,802), and the superior aspects of CGC in a copolymerization reaction of ethylene and α-olefin, compared to metallocene catalysts known so far can be roughly summarized as the following two points: (1) CGC generates a polymer having a high molecular weight while exhibiting high activity even at a high polymerization temperature; and (2) CGC also has extremely excellent copolymerizability of α-olefin having a large steric hindrance, such as 1-hexene and 1-octene. In addition, as the various characteristics of CGC during the polymerization reaction has become increasingly known, attempts to synthesize derivatives of CGC and use the derivatives as a polymerization catalyst have been actively made in the academic and industrial circles.

The improvement in the productivity of an olefin polymer is a very important issue in commercial processes. The productivity in a production process of the olefin polymer is determined by the morphology of the generated polymer particles, the activity of the used catalyst, and the like. In particular, since a catalyst residence time in a reactor varies depending on the process, and accordingly, a time for which the catalyst can be expressed in the process varies, so that the catalyst is required to have characteristics of having high activity while having favorable morphology of the polymer particles generated at the corresponding residence time.

However, catalysts having high activity in the related art have poor morphology of the generated polymer particles, and this is considered to be due to that metallocene catalysts are unevenly distributed in a supported catalyst. Meanwhile, evenly distributed metallocene catalysts have a problem of low activity.

Accordingly, the development of a method for producing a novel metallocene-supported catalyst capable of solving the above-described problems is required.

DISCLOSURE OF THE INVENTION

Technical Problem

An object to be achieved in the present invention is to provide a method for producing a metallocene-supported catalyst having excellent productivity when producing an olefin-based polymer.

Another object to be achieved in the present invention is to provide a metallocene-supported catalyst having excellent productivity when producing an olefin-based polymer.

Still another object to be achieved in the present invention is to provide a method for producing an olefin-based polymer using the metallocene-supported catalyst.

Technical Solution

In order to achieve the above object, the present invention provides a method for producing a metallocene-supported catalyst, the method including: (1) a step of producing a reaction solution 1 by reacting a first metallocene compound with one or more co-catalyst compounds; (2) a step of performing supporting by mixing a support with the reaction solution 1; (3) a step of producing a reaction solution 2 by reacting a second metallocene compound with one or more co-catalyst compounds; and (4) a step of mixing the reaction solution 2 with the supporting material of the step (2).

Moreover, in order to achieve the above another object, the present invention provides a metallocene-supported catalyst produced by the method for producing a metallocene-supported catalyst, the metallocene-supported catalyst including: a support; two or more metallocene compounds selected from the group consisting of a first metallocene compound represented by Formula 1 below, a second metallocene compound represented by Formula 2 below, and a third metallocene compound represented by Formula 3 below; and a co-catalyst compound including one or more among compounds represented by Formulae 7 to 9 below.

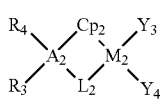  [Formula 1]

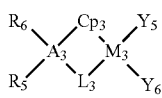  [Formula 2]

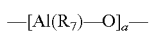  [Formula 3]

—[Al($R_7$)—O]$_a$—  [Formula 7]

D($R_7$)$_3$  [Formula 8]

[L-H]$^+$[Z(A)$_4$]$^-$ or [L]$^+$[Z(A)$_4$]$^-$  [Formula 9]

In Formula 1 or 2, $Cp_1$, $Cp_2$, $L_1$, and $L_2$ are each independently any one cyclic structure selected from the group consisting of cyclopentadienyl, indenyl, 4,5,6,7-tetrahydro-1H-indenyl, fluorenyl, 3H-benzo[b]cyclopenta[d]thiophene, and 1H-benzo[b]cyclopenta[d]thiophene, and one or more hydrogens in the cyclic structure may each independently be substituted with any one substituent among alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, and arylalkyl having 7 to 20 carbon atoms;

$Y_1$ to $Y_4$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;

$A_1$ and $A_2$ are each independently carbon, silicon, or germanium;

$R_1$ to $R_4$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and $M_1$ and $M_2$ are each independently a transition metal of group 4, in Formula 3, $Cp_3$ is any one cyclic structure selected from the group consisting of 6H-cyclopenta[b]thiophene, 4H-cyclopenta[b]thiophene, 3H-benzo[b]cyclopenta[d]thiophene, and 1H-benzo[b]cyclopenta[d]thiophene, and one or more hydrogens in the cyclic structure may each independently be substituted with any one substituent among alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, and arylalkyl having 7 to 20 carbon atoms;

$L_3$ is —NR$_a$—, and Ra is hydrogen or alkyl having 1 to 20 carbon atoms;

$Y_5$ and $Y_6$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;

$A_3$ is carbon, silicon, or germanium;

$R_5$ and $R_6$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and $M_3$ is a transition metal of group 4, in Formulae 7 and 8, $R_7$'s are each independently a halogen radical, a hydrocarbyl radical having 1 to 20 carbon atoms, or a hydrocarbyl radical which has 1 to 20 carbon atoms and is substituted with halogen; and a is an integer of 2 or more; and D is aluminum or boron, and in Formula 9, L is a neutral or cationic Lewis base; H is a hydrogen atom; Z is an element of group 13; A's are each independently aryl having 6 to 20 carbon atoms or alkyl having 1 to 20 carbon atoms, in which one or more hydrogen atoms may be substituted with a substituent; and the substituent is halogen, hydrocarbyl having 1 to 20 carbon atoms, alkoxy having 1 to 20 carbon atoms, or aryloxy having 6 to 20 carbon atoms.

Furthermore, in order to achieve the above still another object, the present invention provides a method for producing an olefin-based polymer, the method including a step for polymerizing an olefin monomer in the presence of the metallocene-supported catalyst.

Advantageous Effects

The method for producing a metallocene-supported catalyst according to the present invention achieves an even distribution of metallocene compounds in a supported catalyst by performing supporting while controlling the spatial positions of the metallocene compounds supported in pores of a support, and can produce a metallocene-supported catalyst, which exhibits excellent productivity during polymerization of an olefin-based polymer, by controlling the expression rate of a catalyst according to the control of the supporting order of the metallocene compounds, and a metallocene-supported catalyst produced by the method can exhibit excellent productivity and thus can be usefully used when producing an olefin polymer.

MODE FOR CARRYING OUT THE INVENTION

Figure 1:
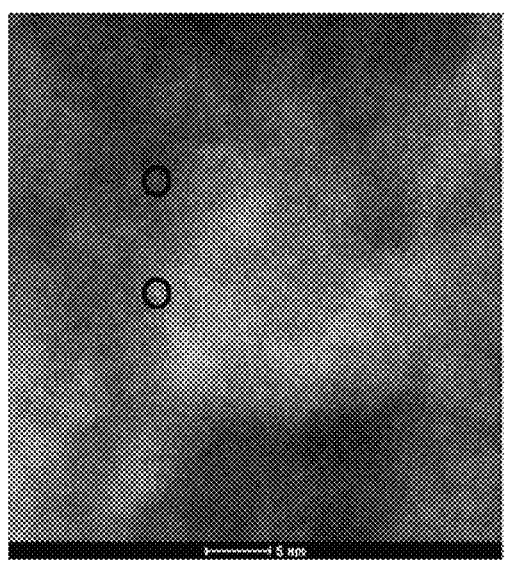
FIG. 1 is a scanning electron microscope (SEM) photograph of each metallocene-supported catalyst produced in Examples 1 and 2.
Figure 1:
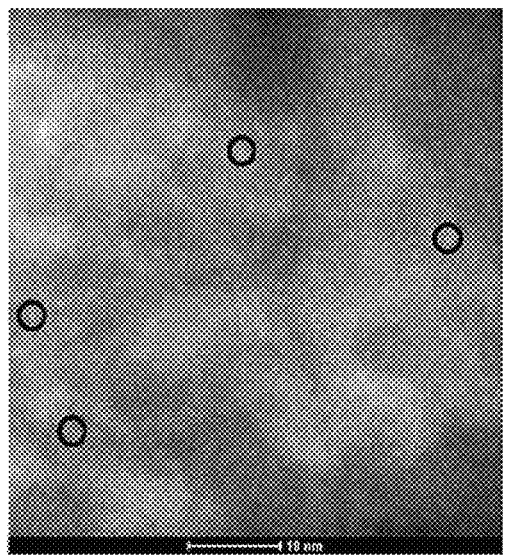

Hereinafter, the present invention will be described in more detail to allow for a clearer understanding of the present invention.

Terms or words used in the present specification and claims shall not be interpreted as being limited to meanings commonly used or meanings defined in dictionaries, and the terms or words should be interpreted as meanings and concepts consistent with the technical idea of the present invention, based on the principle that an inventor can properly define the concept of the terms to best explain the invention.

The term "halogen" used in the present specification refers to fluorine, chlorine, bromine, or iodine, unless otherwise noted.

The term "alkyl" used in the present specification refers to a linear, cyclic, or branched hydrocarbon residue, unless otherwise noted.

The term "cycloalkyl" used in the present specification refers to cyclic alkyl including cyclopropyl and the like, unless otherwise noted.

The term "aryl" used in the present specification refers to an aromatic group including phenyl, naphthyl anthryl, phenanthryl, chrysenyl, pyrenyl, and the like, unless otherwise noted.

The term "alkenyl" used in the present specification refers to a linear or branched alkenyl group, unless otherwise noted.

A method for producing a metallocene-supported catalyst according to the present invention includes: (1) a step of producing a reaction solution 1 by reacting one or more metallocene compounds with one or more co-catalyst compounds; (2) a step of performing supporting by mixing a support with the reaction solution 1; (3) a step of producing a reaction solution 2 by reacting one or more metallocene compounds with one or more co-catalyst compounds; and (4) a step of mixing the reaction solution 2 with the supporting material of the step (2).

In the method for producing a metallocene-supported catalyst according to the present invention, the supporting is performed while controlling the spatial positions of the metallocene compounds, which are supported in pores of a support by supporting one or more compounds stepwise, and thus an even distribution of the metallocene compounds in a supported catalyst can be achieved. Moreover, the expression of the catalyst over time during polymerization of an olefin-based polymer can be controlled by controlling the expression rate of the catalyst according to the control of the supporting order of the metallocene compounds, and the productivity can be improved by controlling the expression of the catalyst according to the residence time of the catalyst in a reactor.

Specifically, since a co-catalyst has a larger size than that of a metallocene compound, when co-catalysts are supported in a support, pores in the support become smaller, and when metallocene compounds are supported after the supporting of the co-catalysts, the metallocene compounds are supported mainly on the surface of the support. Meanwhile, when the co-catalysts are first reacted with the metallocene compounds, and then supported in the support, the reactant is supported up to the inside of the support. Therefore, by dividing the amount of the co-catalysts, reacting the co-catalysts with the metallocene compounds, and then controlling a first supporting amount and a second supporting amount while supporting the reactant, the distribution of the metallocene compounds according to the position in the supported catalyst can be controlled, and since a catalytic reaction occurs from the surface of the supported catalyst, the degrees of an initial reaction and a late reaction can be controlled.

In an aspect of the present invention, the weight ratio of the metallocene compounds of the step (1) and the weight ratio of the metallocene compounds of the step (3) may be 6:1 to 1:6, specifically 5.5:1 to 1:5.5, and more specifically 5:1 to 1:5.

The weight ratio of one or more metallocene compounds supported in the support through the steps (1) and (2) to one or more metallocene compounds supported in the support through the steps (3) and (4) may be within the above range, and by setting the weight ratio within the above range, the one or more metallocene compounds are evenly supported in the pores of the support, so that the supported catalyst can have an even distribution of the metallocene compounds, and thus the expression rate of the catalyst can be appropriately controlled.

The metallocene compounds of the step (1) and the metallocene compounds of the step (3) may specifically include one or more metallocene compounds selected from the group consisting of a first metallocene compound, a second metallocene compound, and a third metallocene compound, and the metallocene compounds of the step (1) and the metallocene compounds of the step (3) may be the same as each other.

Meanwhile, in the step (1) and the step (3), each metallocene compound may be reacted with the co-catalyst.

In the step (1) and the step (3), the used amount of the one or more metallocene compounds and the used amount of the one or more co-catalyst compounds may not be proportional to each other, and in an aspect of the present invention, the weight ratio of the co-catalyst compounds of the step (1) and the co-catalyst compounds of the step (3) may be 2:1 to 6:1, specifically 1.5:1 to 5.5:1, and more specifically 1.1 to 5.1.

The weight ratio of one or more co-catalyst compounds supported in the support through the steps (1) and (2) to one or more co-catalyst compounds supported in the support through the steps (3) and (4) may be within the above range, and when the weight ratio satisfies the above range, the transition metal compounds and co-catalysts to be supported in the support are supported inside and on the surface of the support in an appropriate ratio, so that the initial reaction and the late reaction of the catalyst can be appropriately controlled.

The co-catalyst compounds of the step (1) and the co-catalyst compounds of the step (3) may be the same as each other, the co-catalyst compounds of the step (1) and the co-catalyst compounds of the step (3) may include an alkylaluminoxane compound, and the above range of the weight ratio may be for the alkylaluminoxane compound.

The first metallocene compound may be a metallocene compound represented by Formula 1 below.

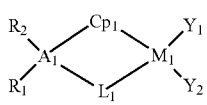
[Formula 1]

In Formula 1,
$Cp_1$ and $L_1$ are each independently any one cyclic structure selected from the group consisting of cyclopentadienyl, indenyl, 4,5,6,7-tetrahydro-1H-indenyl, fluorenyl, 3H-benzo[b]cyclopenta[d]thiophene, and 1H-benzo[b]cyclopenta[d]thiophene, and one or more hydrogens in the cyclic structure may each independently be substituted with any one substituent among alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, and arylalkyl having 7 to 20 carbon atoms;
$Y_1$ and $Y_2$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;
$A_1$ is carbon, silicon, or germanium;
$R_1$ and $R_2$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and
$M_1$ is a transition metal of group 4.

Moreover, in Formula 1, $Cp_1$ may be any one cyclic structure selected from the group consisting of cyclopentadienyl, indenyl, 4,5,6,7-tetrahydro-1H-indenyl, and fluorenyl, and one or more hydrogens in the cyclic structure may each independently be substituted with any one substituent among alkyl having 1 to 12 carbon atoms, alkoxy having 1 to 12 carbon atoms, alkoxyalkyl having 2 to 12 carbon atoms, and aryl having 6 to 12 carbon atoms;
$L_1$ may be any one cyclic structure selected from the group consisting of cyclopentadienyl, indenyl, and 4,5,6,7-tetrahydro-1H-indenyl, and one or more hydrogens in the cyclic structure may each independently be substituted with any one substituent among alkyl having 1 to 12 carbon atoms, alkoxy having 1 to 12 carbon atoms, alkoxyalkyl having 2 to 12 carbon atoms, and aryl having 6 to 12 carbon atoms;
$Y_1$ and $Y_2$ may be the same as or different from each other, and may be each independently halogen, alkyl having 1 to 12 carbon atoms, alkenyl having 2 to 12 carbon atoms, or aryl having 6 to 12 carbon atoms;
$A_1$ may be carbon, silicon, or germanium;
$R_1$ and $R_2$ may be the same as or different from each other, and may be each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and
$M_1$ may be Ti, Zr, or Hf.

Furthermore, in Formula 1, $Cp_1$ may be any one cyclic structure selected from the group consisting of indenyl and 4,5,6,7-tetrahydro-1H-indenyl, and one or more hydrogens in the cyclic structure may each independently be substituted with any one substituent among alkyl having 1 to 12 carbon atoms and aryl having 6 to 12 carbon atoms;
$L_1$ may be cyclopentadienyl, and one or more hydrogens in the cyclopentadienyl may each independently be substituted with alkyl having 1 to 12 carbon atoms;
$Y_1$ and $Y_2$ may be the same as or different from each other, and may be each independently halogen or alkyl having 1 to 12 carbon atoms;
$A_1$ may be carbon or silicon;
$R_1$ and $R_2$ may be the same as or different from each other, and may be each independently hydrogen, alkyl having 1 to 20 carbon atoms, alkoxy having 1 to 20 carbon atoms, or alkoxyalkyl having 2 to 20 carbon atoms; and
$M_1$ may be Ti or Zr.

Meanwhile, the second metallocene compound may be a metallocene compound represented by Formula 2 below.

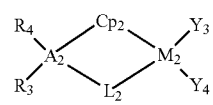
[Formula 2]

In Formula 2,
$Cp_2$ and $L_2$ are each independently any one cyclic structure selected from the group consisting of cyclopentadienyl, indenyl, 4,5,6,7-tetrahydro-1H-indenyl, fluorenyl, 3H-benzo[b]cyclopenta[d]thiophene, and 1H-benzo[b]cyclopenta[d]thiophene, and one or more hydrogens in the cyclic structure may each independently be substituted with any one substituent among alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, and arylalkyl having 7 to 20 carbon atoms;

$Y_3$ and $Y_4$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;

$A_2$ is carbon, silicon, or germanium;

$R_3$ and $R_4$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and $M_2$ is a transition metal of group 4.

Moreover, in Formula 2, $Cp_2$ may be any one cyclic structure selected from the group consisting of cyclopentadienyl, indenyl, 4,5,6,7-tetrahydro-1H-indenyl, and fluorenyl, and one or more hydrogens in the cyclic structure may each independently be substituted with any one substituent among alkyl having 1 to 12 carbon atoms, alkoxy having 1 to 12 carbon atoms, alkoxyalkyl having 2 to 12 carbon atoms, aryl having 6 to 12 carbon atoms, alkylaryl having 7 to 20 carbon atoms, and arylalkyl having 7 to 20 carbon atoms;

$L_2$ may be any one cyclic structure selected from the group consisting of cyclopentadienyl, indenyl, and 4,5,6,7-tetrahydro-1H-indenyl, and one or more hydrogens in the cyclic structure may each independently be substituted with any one substituent among alkyl having 1 to 12 carbon atoms, alkoxy having 1 to 12 carbon atoms, alkoxyalkyl having 2 to 12 carbon atoms, and aryl having 6 to 12 carbon atoms;

$Y_3$ and $Y_4$ may be the same as or different from each other, and may be each independently halogen, alkyl having 1 to 12 carbon atoms, alkenyl having 2 to 12 carbon atoms, or aryl having 6 to 12 carbon atoms;

$A_2$ may be carbon, silicon, or germanium;

$R_3$ and $R_4$ may be the same as or different from each other, and may be each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and $M_2$ may be Ti, Zr, or Hf.

Furthermore, in Formula 2, $Cp_2$ may be any one cyclic structure selected from the group consisting of indenyl and 4,5,6,7-tetrahydro-1H-indenyl, and one or more hydrogens in the cyclic structure may each independently be substituted with any one substituent among alkyl having 1 to 12 carbon atoms, aryl having 6 to 12 carbon atoms, and alkylaryl having 7 to 20 carbon atoms;

$L_2$ may be cyclopentadienyl, and one or more hydrogens in the cyclopentadienyl may each independently be substituted with alkyl having 1 to 12 carbon atoms;

$Y_3$ and $Y_4$ may be the same as or different from each other, and may be each independently halogen or alkyl having 1 to 12 carbon atoms;

$A_2$ may be carbon or silicon;

$R_3$ and $R_4$ may be the same as or different from each other, and may be each independently hydrogen, alkyl having 1 to 20 carbon atoms, alkoxy having 1 to 20 carbon atoms, or alkoxyalkyl having 2 to 20 carbon atoms; and $M_2$ may be Ti or Zr.

In addition, the third metallocene compound may be a metallocene compound represented by Formula 3 below.

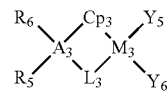

[Formula 3]

In Formula 3, $Cp_3$ is any one cyclic structure selected from the group consisting of 6H-cyclopenta[b]thiophene, 4H-cyclopenta[b]thiophene, 3H-benzo[b]cyclopenta[d]thiophene, and 1H-benzo[b]cyclopenta[d]thiophene, and one or more hydrogens in the cyclic structure may each independently be substituted with any one substituent among alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, and arylalkyl having 7 to 20 carbon atoms;

$L_3$ is —$NR_a$—, and Ra is hydrogen or alkyl having 1 to 20 carbon atoms;

$Y_5$ and $Y_6$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;

$A_3$ is carbon, silicon, or germanium;

$R_5$ and $R_6$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and $M_3$ is a transition metal of group 4.

Moreover, in the aspect of the present invention, in Formula 3, $Cp_3$ may be any one cyclic structure selected from the group consisting of 6H-cyclopenta[b]thiophene and 3H-benzo[b]cyclopenta[d]thiophene, and one or more hydrogens in the cyclic structure may each independently be substituted with any one substituent among alkyl having 1 to 12 carbon atoms, aryl having 6 to 12 carbon atoms, and alkylaryl having 7 to 20 carbon atoms;

$L_3$ may be —$NR_a$—, and Ra may be alkyl having 1 to 12 carbon atoms;

$Y_5$ and $Y_6$ may be the same as or different from each other, and may be each independently halogen or alkyl having 1 to 12 carbon atoms;

$A_3$ may be carbon or silicon;

$R_5$ and $R_6$ may be the same as or different from each other, and may be each independently hydrogen, alkyl having 1 to 20 carbon atoms, alkoxy having 1 to 20 carbon atoms, or alkoxyalkyl having 2 to 20 carbon atoms; and $M_3$ may be Ti or Zr.

In the aspect of the present invention, the compound represented by Formula 1, the compound represented by Formula 2, and the compound represented by Formula 3 may have different structures, or may have the same core but different substituents, and these compounds are not necessary to be represented by the same formula.

In the aspect of the present invention, the first metallocene compound may include a metallocene compound represented by Formula 4 below, the second metallocene compound may include a metallocene compound represented by Formula 5 below, and the third metallocene compound may include a metallocene compound represented by Formula 6 below.

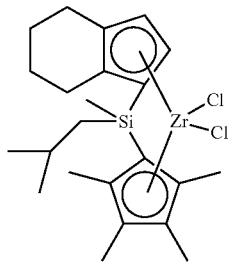

[Formula 4]

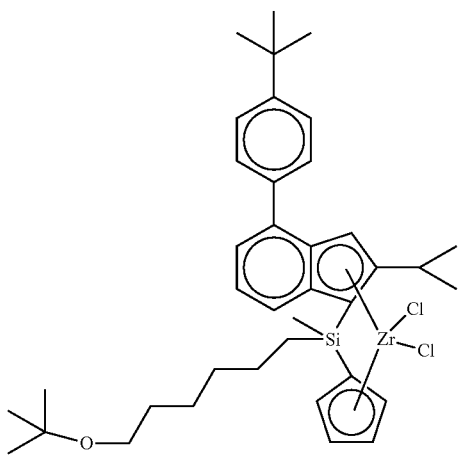

[Formula 5]

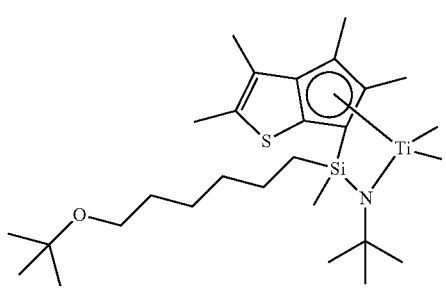

[Formula 6]

Meanwhile, the one or more co-catalyst compounds of the step (1) and the one or more co-catalyst compounds of the step (3) may include one or more among compounds represented by Formulae 7 to 9 below.

$$-[Al(R_7)-O]_a-$$ [Formula 7]

$$D(R_7)_3$$ [Formula 8]

$$[L-H]^+[Z(A)_4]^- \text{ or } [L]^+[Z(A)_4]^-$$ [Formula 9]

In the formulae, $R_7$'s are each independently a halogen radical, a hydrocarbyl radical having 1 to 20 carbon atoms, or a hydrocarbyl radical which has 1 to 20 carbon atoms and is substituted with halogen; and a is an integer of 2 or more;

D is aluminum or boron; and

L is a neutral or cationic Lewis base; H is a hydrogen atom; Z is an element of group 13; A's are each independently aryl having 6 to 20 carbon atoms or alkyl having 1 to 20 carbon atoms, in which one or more hydrogen atoms may be substituted with a substituent; and the substituent is halogen, hydrocarbyl having 1 to 20 carbon atoms, alkoxy having 1 to 20 carbon atoms, or aryloxy having 6 to 20 carbon atoms.

The molar ratio of the compound represented by Formula 5 or Formula 6 with respect to the total number of moles of one or more metallocene compounds included in the metallocene-supported catalyst may be 1:2 to 1:5,000, specifically 1:10 to 1:1,000, and more specifically 1:20 to 1:500.

Moreover, the molar ratio of the compound represented by Formula 7 with respect to the total number of moles of one or more metallocene compounds may be 1:1 to 1:25, specifically 1:1 to 1:10, and more specifically 1:1 to 1:5.

When the molar ratio of the compound represented by Formula 7 or Formula 8 with respect to the total number of moles of the one or more metallocene compounds is less than 1:2, the amount of an alkylating agent is extremely small, and thus the alkylation of a metal compound may not completely proceed, and when the ratio exceeds 1:5,000, the alkylation of the metal compound is performed, but the alkylated metal compound may not be completely activated due to a side reaction between an excess of the remaining alkylating agent and an activating agent represented by Formula 9.

The molar ratio of the compound represented by Formula 9 with respect to the total number of moles of the one or more metallocene compounds may be 1:1 to 1:500, specifically 1:1 to 1:50, and more specifically 1:2 to 1:25. When the molar ratio is less than 1:1, the amount of an activating agent is relatively small, so that the activation of a metal compound may not completely proceed, and thus the activity of the generated catalyst composition may be decreased, and when the molar ratio exceeds 1:500, the activation of the metal compound completely proceeds, but due to an excess of the remaining activating agent, the unit cost of the catalyst composition may not be economical, or the purity of the generated polymer may be decreased.

The compound represented by Formula 7 is not particularly limited as long as the compound is alkylaluminoxane, includes, for example, methylaluminoxane, ethylaluminoxane, isobutylaluminoxane, butylaluminoxane, and the like, and may be specifically methylaluminoxane.

The compound represented by Formula 8 is not particularly limited, includes, for example, trimethylaluminum, triethylaluminum, triisobutylaluminum, tripropylaluminum, tributylaluminum, dimethylchloroaluminum, triisopropylaluminum, tri-s-butyl aluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolyl aluminum, dimethylaluminum methoxide, dimethylaluminum ethoxide, trimethylboron, triethylboron, triisobutylboron, tripropylboron, tributylboron, and the like, and may be specifically trimethylaluminum, triethylaluminum, or triisobutylaluminum.

The compound represented by Formula 9 includes, for example, triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilidium tetrapetylboron, N,N-diethylanilidium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetraphenylaluminum, N,N-diethylanilinium tetrapentafluorophenylaluminum, diethylammonium tetrapentatentraphenylaluminum, triphenylphosphonium tetraphenylaluminum, trimethylphosphonium tetraphenylaluminum, triethylammonium tetraphenylaluminum, tributylammonium tetraphenylaluminum, trimethylammonium tetraphenylboron, tripropylammonium tetraphenylboron, trimethylammonium tetra(p-tolyl)boron, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetraphenylboron, N,N-diethylanilinium tetrapentafluorophenylboron, diethylammonium tetrapentafluorophenylboron, triphenylphosphonium tetraphenylboron, triphenylcarbonium tetra(p-trifluoromethylphenyl)boron, and triphenylcarbonium tetrapentafluorophenylboron and the like.

A solvent may be used in the reaction between the one or more metallocene compounds and the one or more co-catalyst compounds in the steps (1) and (3), and the mixing of the support and the reaction solution 1 in the step (2), and the reaction and the supporting may be performed without a separate solvent.

As the solvent, an aliphatic hydrocarbon solvent having 5 to 12 carbon atoms, such as pentane, hexane, heptane, nonane, decane, and isomers thereof, an aromatic hydrocarbon solvent such as toluene and benzene, a hydrocarbon solvent substituted with a chlorine atom, such as dichloromethane and chlorobenzene, and the like can be used. The solvent used here can be used after being treated with a small amount of alkylaluminum to remove a small amount of water, air, or the like that acts as catalyst poison.

The supporting conditions in the step (2), and the supporting conditions in the step (4), which is a step for mixing the reaction solution 2 with the supporting material of the step (2), are not particularly limited, and the supporting can be performed within a range well known to a person with ordinary skill in the art. For example, the supporting may be performed by appropriately using high-temperature supporting and low-temperature supporting, and the supporting in step (2) may be performed at −30° C. to 150° C., specifically at room temperature to 100° C., and more specifically at 30° C. to 80° C. Moreover, the supporting time may be appropriately controlled according to the amount of the compound to be supported.

The supported catalyst obtained through the step (4) may be used as it is after removing a reaction solvent by filtration or distillation under reduced pressure, or may be used after being filtered with aromatic hydrocarbon such as toluene, if necessary.

The support may be silica, silica-alumina, silica-magnesia, or the like, may have both a hydroxyl group and a siloxane group, which have high reactivity, on the surface, and may contain an oxide, carbonate, sulfate, or nitrate component such as $Na_2O$, $K_2CO_3$, $BaSO_4$, or $Mg(NO_3)_2$.

The support can be used in a sufficiently dried state before the co-catalyst or the like is supported, and the drying temperature of the support may be 200° C. to 800° C., specifically 300° C. to 650° C., and more specifically 400° C. to 650° C. When the drying temperature of the support is too low, there is too much moisture so that the moisture on the surface and the co-catalyst are reacted, and when the drying temperature is too high, the pores on the surface of the support are combined, so that a surface area is reduced, and many hydroxyl groups on the surface disappear and only siloxane groups remain, so that the number of reaction sites with the co-catalyst may be decreased.

Moreover, the present invention provides a metallocene-supported catalyst produced by the method for producing a metallocene-supported catalyst.

The metallocene-supported catalyst according to an aspect of the present invention is produced by the method for producing a metallocene-supported catalyst, and may include: a support; two or more metallocene compounds selected from the group consisting of a first metallocene compound represented by Formula 1 below, a second metallocene compound represented by Formula 2 below, and a third metallocene compound represented by Formula 3 below; and a co-catalyst compound including one or more among compounds represented by Formulae 7 to 9 below.

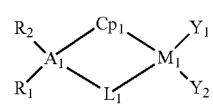 [Formula 1]

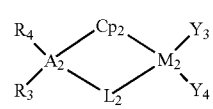 [Formula 2]

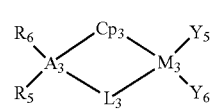 [Formula 3]

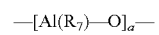 [Formula 7]

 [Formula 8]

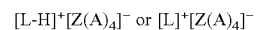 [Formula 9]

In Formula 1 or 2, $Cp_1$, $Cp_2$, $L_1$, and $L_2$ are each independently any one cyclic structure selected from the group consisting of cyclopentadienyl, indenyl, 4,5,6,7-tetrahydro-1H-indenyl, fluorenyl, 3H-benzo[b]cyclopenta[d]thiophene, and 1H-benzo[b]cyclopenta[d]thiophene, and one or more hydrogens in the cyclic structure may each independently be substituted with any one substituent among alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, and arylalkyl having 7 to 20 carbon atoms;

$Y_1$ to $Y_4$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;

$A_1$ and $A_2$ are each independently carbon, silicon, or germanium;

$R_1$ to $R_4$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and $M_1$ and $M_2$ are each independently a transition metal of group 4, in Formula 3, $Cp_3$ is any one cyclic structure selected from the group consisting of 6H-cyclopenta[b]thiophene, 4H-cyclopenta[b]thiophene, 3H-benzo[b]cyclopenta[d]thiophene, and 1H-benzo[b]cyclopenta[d]thiophene, and one or more hydrogens in the cyclic structure may each independently be substituted with any one substituent among alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, and arylalkyl having 7 to 20 carbon atoms;

$L_3$ is —$NR_a$—, and Ra is hydrogen or alkyl having 1 to 20 carbon atoms;

$Y_5$ and $Y_6$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;

$A_3$ is carbon, silicon, or germanium;

$R_5$ and $R_6$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and $M_3$ is a transition metal of group 4, in Formulae 7 and 8, $R_7$'s are each independently a halogen radical, a hydrocarbyl radical having 1 to 20 carbon atoms, or a hydrocarbyl radical which has 1 to 20 carbon atoms and is substituted with halogen; and a is an integer of 2 or more; and D is aluminum or boron, and in Formula 9, L is a neutral or cationic Lewis base; H is a hydrogen atom; Z is an element of group 13; A's are each independently aryl having 6 to 20 carbon atoms or alkyl having 1 to 20 carbon atoms, in which one or more hydrogen atoms may be substituted with a substituent; and the substituent is halogen, hydrocarbyl having 1 to 20 carbon atoms, alkoxy having 1 to 20 carbon atoms, or aryloxy having 6 to 20 carbon atoms.

The support; the first metallocene compound represented by Formula 1; the second metallocene compound represented by Formula 2; the third metallocene compound represented by Formula 3; and the co-catalyst compound including one or more among compounds represented by Formulae 7 to 9 are as described above in the method for producing a metallocene-supported catalyst.

Furthermore, the present invention provides a method for producing an olefin-based polymer, the method including a step for polymerizing an olefin monomer in the presence of the metallocene-supported catalyst.

Since, in the metallocene-supported catalyst according to the present invention, the metallocene compounds supported in the pores of the support are evenly distributed, and the expression rates of the contained first metallocene compound and second metallocene compound can be controlled according to the control of the supporting order of the metallocene compounds, the metallocene-supported catalyst can exhibit excellent productivity during polymerization of an olefin-based polymer, and thus a method for producing an olefin-based polymer using the metallocene-supported catalyst can exhibit excellent productivity.

Examples of an olefin-based monomer, which can be polymerized using the metallocene-supported catalyst according to the present invention, include ethylene, α-olefin, and cyclic olefin, and a diene olefin-based monomer or triene olefin-based monomer having two or more double bonds can also be polymerized. Specific examples of the monomer include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, α-methylstyrene, divinylbenzene, and 3-chloromethylstyrene, and two or more of these monomers may be mixed and copolymerized.

The polymerization reaction may be performed by homopolymerization of one olefin-based monomer or copolymerization of two or more monomers, using one continuous slurry polymerization reactor, a loop slurry reactor, a gas-phase reactor, or a solution reactor.

The metallocene-supported catalyst may be dissolved in or diluted with an aliphatic hydrocarbon solvent having 4 to 12 carbon atoms, such as isobutane, pentane, hexane, heptane, nonane, decane, and isomers thereof, an aromatic hydrocarbon solvent such as toluene and benzene, a hydrocarbon solvent substituted with a chlorine atom, such as dichloromethane and chlorobenzene, and the like, and then injected. The solvent used here is preferably used after being treated with a small amount of alkylaluminum to remove a small amount of water, air, or the like that acts as catalyst poison, and a co-catalyst can be further used.

Hereinafter, the present invention will be described in more detail with reference to the following Examples. These Examples are for a clearer understanding of the present invention, and the scope of the present invention is not limited to these Examples.

Synthesis of Ligand and Transition Metal Compound

Unless otherwise noted, organic reagents and solvents were purchased from Sigma-Aldrich, Inc., purified by standard methods, and then used. The reproducibility of the experiment was enhanced by blocking the contact of air and moisture in all stages of the synthesis.

Production Example 1: Production of First Metallocene Compound

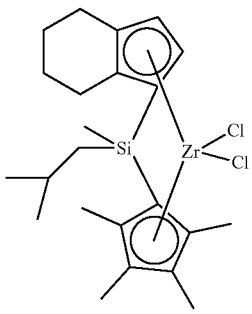

[Formula 4]

(1) Production of Ligand Compound

Tetramethylcyclopentadiene (TMCP) was lithiated with n-BuLi (1 equivalent) in THF (0.4 M), then filtered, and used as tetramethylcyclopentyl-Li salts (TMCP-Li salts). Indene was lithiated with n-BuLi (1 equivalent) in hexane (0.5 M), filtered, and used as indene-Li salts (Ind-Li salts). Into a 250-mL Schlenk flask, 50 mmol of tetramethylcyclopentyl-Li salts (TMCP-Li salts) and about 100 mL of tetrahydrofuran (THF) were put, under Ar. At −20° C., 1 equivalent of dichloromethyl-(iso-propyl) silane was added. After 6 hours, 3 mol % of CuCN and indene-Li salts (50 mmol, MTBE 1M solution) were added at −20° C., and the mixture was reacted for about 12 hours. The organic layer was separated with water and hexane to obtain a ligand.

(2) Production of Metallocene Compound

Into the dried 250-mL Schlenk flask, 50 mmol of the ligand compound synthesized in section (1) was put, and dissolved in 100 mL of MTBE under Ar, and 2 equivalents of n-BuLi was added dropwise at −20° C. After the reaction for about 16 hours, a ligand-Li solution was added to $ZrCl_4(THF)_2$ (50 mmol, MTBE 1M solution). After the reaction for about 16 hours, the solvent was removed, and the resultant was dissolved in methylene chloride (MC) and filtered to remove LiCl. The solvent of the filtrate was removed, about 50 mL of MTBE and about 100 mL of hexane were added, and the mixture was stirred for about 2 hours and filtered to obtain a solid metallocene catalyst precursor.

The metallocene catalyst precursor (20 mmol) obtained above, 60 mL of dichloromethane (DCM), and 5 mol % of a Pd/C catalyst were put into a high-pressure stainless steel (sus) reactor under an argon atmosphere. Argon in the high-pressure reactor was replaced with hydrogen three times, and the reactor was filled with hydrogen so that the pressure was about 20 bar. Stirring was performed for 24 hours at 35° C., and the reaction was completed. The gas in the reactor was replaced with argon, and then the DCM solution was transferred to a Schlenk flask under an argon atmosphere. The solution was passed through celite under argon to remove the Pd/C catalyst, and the solvent was dried to obtain a solid catalyst precursor.

$^1$H NMR (500 MHz, $C_6D_6$): 0.62 (3H, s), 0.98 (3H, d), 1.02 (3H, d), 1.16 (2H, dd), 1.32-1.39 (3H, m), 1.78 (3H, s), 1.81 (3H, s), 1.84-1.94 (3H, m), 2.01 (3H, s), 2.03 (1H, m), 2.04 (3H, s), 2.35 (2H, m), 2.49-2.55 (1H, m), 3.13-3.19 (1H, m), 5.27 (1H, d), 6.75 (1H, d).

Production Example 2: Production of Second Metallocene Compound

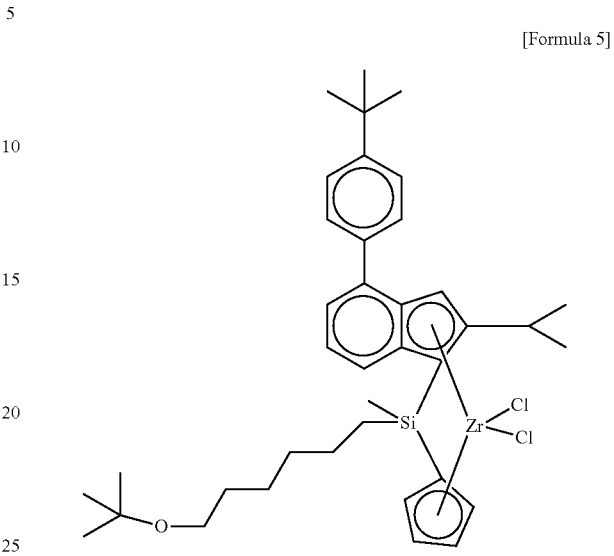

[Formula 5]

(1) Production of Ligand Compound

Into the dried 250-mL Schlenk flask, 11.618 g (40 mmol) of 4-(4-(tert-butyl)phenyl)-2-isopropyl-1H-indene was put, and 100 mL of THF was injected under argon. After cooling diethyl ether to 0° C., 18.4 mL (46 mmol) of a solution of 2.5 M nBuLi in hexane was gradually added dropwise. The temperature of the reaction mixture was gradually raised to room temperature, and then the reaction mixture was stirred until the next day. A solution including 12.0586 g (40 mmol, calculated as a purity of 90%) of dichloro(methyl)(tert-butoxyhexyl) silane and 100 mL of hexane was prepared in another 250-mL Schlenk flask, the Schlenk flask was cooled to −30° C., and then the lithiated solution was added dropwise thereto. After the injection was completed, the temperature of the mixture was gradually raised to room temperature, and then the mixture was stirred for a day. The next day, 33.6 mL of cyclopentyl-Na salts (Na—Cp, in 2M THF) was added dropwise, the mixture was stirred for a day, then 50 mL of water was put into the flask to perform quenching, and the organic layer was separated and dried over $MgSO_4$. As a result, 23.511 g (52.9 mmol) of oil was obtained (purity based on NMR/wt %=92.97%, Mw=412.69).

(2) Production of Metallocene Compound

The ligand was put into a 250-mL Schlenk flask dried in an oven and dissolved in 80 mL of toluene and 19 mL (160 mmol, 4 equiv.) of MTBE, then 2.1 equivalents of an n-BuLi solution (84 mmol, 33.6 mL) was added, and lithiation was performed until the next day. From a glove box, 1 equivalent of $ZrCl_4(THF)_2$ was taken, and placed in a 250-mL Schlenk flask, and a suspension containing ether was prepared. Both the flasks were cooled to −20° C., and then ligand anions were gradually added to a Zr suspension. After the injection was completed, the temperature of the reaction mixture was gradually raised to room temperature. After stirring the resultant for a day, MTBE in the mixture was immediately filtered with a Schlenk filter under argon to remove LiCl generated after the reaction. The filtrate remaining after the removal was removed through vacuum decompression, and pentane having a volume similar to that of a reaction solvent was added to a small amount of dichloromethane. In this case, the reason for adding pentane is that the synthesized catalyst precursor has a low solubility in pentane and thus crystallization is promoted. After filtering the slurry under argon, the filter cake remaining on the top and the filtrate were checked for catalyst synthesis through NMR, weighed in a glove box, and sampled to check the yield and purity thereof (Mw=715.04).

$^1$H NMR (500 MHz, CDCl$_3$): 0.60 (3H, s), 1.01 (2H, m), 1.16 (6H, s), 1.22 (9H, s), [0294] 1.35 (4H, m), 1.58 (4H, m), 2.11 (1H, s), 3.29 (2H, m), 5.56 (1H, s), 5.56 (2H, m), 5.66 (2H, m), 7.01 (2H, m), 7.40 (3H, m), 7.98 (2H, m)

Production Example 3: Production of Third Metallocene Compound

[Formula 6]

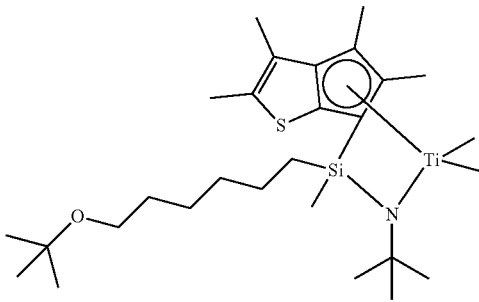

(1) Production of Ligand Compound (i) Production of (E)-1-(4,5-dimethylthiophen-2-yl)-2-methylbut-2-en-1-one)

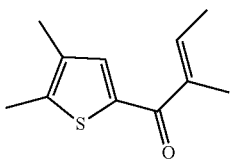

After quantifying 9.99 g (89.1 mmol) of 2,3-dimethylthiophene in a Schlenk flask, 90 mL of THF was added to perform dissolution. After adding n-BuLi (1.05 eq., 37.4 mL) dropwise at −78° C., the mixture was reacted overnight at room temperature (RT). After quantifying CuCN (0.5 eq., 4 g) in another Schlenk flask, 30 mL of THF was added, the temperature was lowered to −78° C., and then the reaction liquid was transferred. After the reaction for 2 hours at room temperature, tigloyl chloride (1 eq., 9.8 mL) was added dropwise at −78° C. After the reaction overnight at room temperature, work-up with a Na$_2$CO$_3$ aqueous solution and ethyl acetate (EA) was performed, and then the organic layer was concentrated to obtain 15.8 g of a brown product at a yield of 89.5%.

$^1$H-NMR (in CDCl$_3$, 500 MHz): 7.94 (s, 1H), 7.17-7.16 (m, 1H), 3.04 (s, 3H), 2.81 (s, 3H), 2.59 (s, 3H), 2.53 (d, 3H)

(ii) Production of 2,3,4,5-tetramethyl-4,5-dihydro-6H-cyclopenta[b]thiophen-6-one

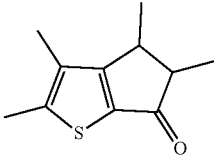

After quantifying 15.48 g (79.7 mmol) of (E)-1-(4,5-dimethylthiophen-2-yl)-2-methylbut-2-en-1-one produced above in a 1-L round-bottom flask (one neck), 15 mL of chlorobenzene was added, and the mixture was stirred. After pouring 100 mL of sulfuric acid, the mixture was reacted overnight at room temperature, 800 mL of deionized water (DIW) was added, the mixture was stirred and then transferred to a separate panel, and extraction was performed with ethyl acetate. The organic layer was washed with a Na$_2$CO$_3$ aqueous solution, and then concentrated to produce 10.66 g of a maroon oil product at a yield of 68.9%.

$^1$H-NMR (in CDCl$_3$, 500 MHz): 6.28 (s, 2H), 6.35 (s, 1H), 3.33-3.32 (m, 4H), 2.48 (s, 6H), 2.36 (s, 6H), 1.97 (d, 6H), 1.51 (s, 18H), 1.46-1.26 (m, 20H), 1.18 (m, 18H), 0.49 (s, 3H), 0.46 (s, 3H), 0.31 (s, 6H), 0.00 (s, 3H), −0.20 (s, 3H)

(iii) Production of 2,3,4,5-tetramethyl-6H-cyclopenta[b]thiophene

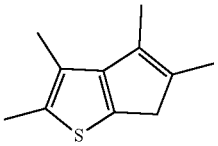

After quantifying 3 g (15.4 mmol) of the 2,3,4,5-tetramethyl-4,5-dihydro-6H-cyclopenta[b]thiophen-6-one produced above in a vial, 18 mL of THF and 12 mL of methanol (MeOH) were added to perform dissolution. The vial was immersed in ice water at 0° C., NaBH$_4$ (1.5 eq., 876 mg) was added little by little using a spatula while stirring. After the reaction overnight at room temperature, deionized water was added, the organic layer was separated and concentrated, 60 mL of THF and 60 mL of deionized water were mixed in a ratio of 1:1, 12 mL of 3N HCl was added to perform dissolution, and the resultant was heated for 3 hours at 80° C. Hexane and deionized water were added, and the organic layer was separated, then neutralized with a Na$_2$CO$_3$ aqueous solution, and concentrated to obtain 2.3 g of a brown liquid product at a yield of 83.5%.

$^1$H-NMR (in CDCl$_3$, 500 MHz): 6.28 (s, 2H), 3.15 (m, 1H), 3.05 (m, 1H), 2.37 (s, 6H), 2.16 (s, 6H), 2.16 (s, 6H), 2.03 (s, 6H), 1.28 (d, 6H)

(iv) Production of 1-(6-(tert-butoxy)hexyl)-N-(tert-butyl)-1-methyl-1-(2,3,4,5-tetramethyl-6H-cyclopenta[b]thiophen-6-yl)silanamine

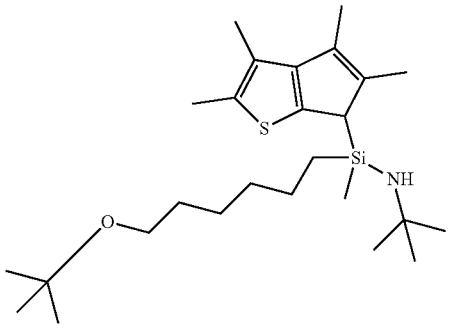 [SMILES: CC1=C(C)C([Si](C)(CCCCCCOCC(C)(C)C)NC(C)(C)C)c2sc(C)c(C)c21]

After quantifying 2.3 g (12.9 mmol) of the 2,3,4,5-tetramethyl-6H-cyclopenta[b]thiophene produced above in a Schlenk flask, 65 mL of THF was added to perform dissolution, and n-BuLi (1.05 eq., 5.4 mL) was added dropwise at −78° C. After the reaction overnight at room temperature (RT), (6-(tert-butoxy)hexyl)methylsilane (tether silane, 1.05 eq., 5.4 mL) as a silane compound was quantified in another Schlenk flask, 30 mL of THF was added, the temperature was lowered to 0° C., and the resultant was transferred to the reaction liquid and then left overnight at room temperature. The solvent was dried through distillation under reduced pressure, and then the resultant was filtered with hexane and concentrated to obtain 5 g of a brown oil product at a yield of 86.2%.

$^1$H-NMR (in CDCl$_3$, 500 MHz): 3.32 (m, 4H), 2.35 (s, 6H), 2.25 (s, 6H), 2.11 (s, 6H), 2.07 (s, 3H), 2.05 (s, 3H), 1.51-1.27 (m, 20H), 1.19 (s, 36H), 0.15 (s, 3H), 0.00 (s, 3H)

(2) Production of Transition Metal Compound

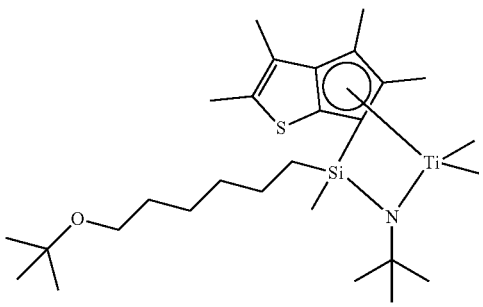

After quantifying 2.97 g (6.6 mmol) of 1-(6-(tert-butoxy)hexyl)-N-(tert-butyl)-1-methyl-1-(2,3,4,5-tetramethyl-6H-cyclopenta[b]thiophen-6-yl)silanamine produced above in a Schlenk flask, 33 mL of MTBE was added to perform dissolution. At −78° C., n-BuLi (2.05 eq., 5.4 mL) was added dropwise, and then the mixture was reacted overnight at room temperature (RT). After MMB (2.5 eq., 5.5 mL) and TiCl4 (1 eq., 6.6 mL) were added dropwise at −78° C., the mixture was reacted overnight at room temperature, dried under vacuum, and then filtered with hexane, and DME (3 eq., 2.1 mL) was added dropwise. After the reaction overnight at room temperature, the solvent was dried under reduced pressure, and the resultant was filtered with hexane and concentrated to obtain 2.8 g of a transition metal compound (silane bridged dimethyl titanium compound) at a yield of 81.3%.

$^1$H-NMR (in CDCl$_3$, 500 MHz): 3.32 (m, 4H), 2.47 (s, 3H), 2.34 (s, 6H), 2.30 (s, 6H), 1.95 (s, 3H), 1.50 (s, 18H), 1.40 (s, 6H), 1.31-1.26 (m, 20H), 1.18 (s, 18H), 0.49 (s, 3H), 0.48 (s, 3H), 0.46 (s, 6H), 0.34 (s, 3H), −0.09 (s, 3H), −0.23 (s, 3H)

Example 1

<Preparation of Support>
Silica (SP 952, produced by Grace Davison Company) was dehydrated and dried under vacuum for 12 hours at a temperature of 200° C.
<Production of Metallocene-Supported Catalyst>
The first metallocene compound (0.04 mmol) produced in Production Example 1, the second metallocene compound (0.02 mmol) produced in Production Example 2, and 72 g of a methylaluminoxane (MAO)/toluene solution (10 wt % in toluene) were put into a glass reactor, and reacted with stirring for 2 hours at room temperature to produce a reaction solution 1.

Moreover, 10 g of dried silica was put into another glass reactor, 100 mL of toluene was added, and the mixture was stirred. The reaction solution 1 was added thereto, and the mixture was reacted for 4 hours at 40° C. Thereafter, the reaction product was washed with a sufficient amount of toluene to produce a support.

The first metallocene compound (0.16 mmol) produced in Production Example 1, the second metallocene compound (0.08 mmol) produced in Production Example 2, and 18 g of a methylaluminoxane (MAO)/toluene solution (10 wt % in toluene) were put into a glass reactor, and reacted with stirring for 2 hours at room temperature to produce a reaction solution 2.

The support was added to the reaction solution 2, and the mixture was reacted for 4 hours at 40° C. Thereafter, the reaction product was washed with a sufficient amount of toluene, and then dried under vacuum to obtain a metallocene-supported catalyst as a solid power.

Example 2

A metallocene-supported catalyst was obtained through the same processes as in Example 1, except that, in Example 1, the amounts of the first metallocene compound and the second metallocene compound used in the production of the reaction solution 1 were changed to 0.16 mmol and 0.08 mmol, respectively, and the amounts of the first metallocene compound and the second metallocene compound used in the production of the reaction solution 2 were changed to 0.04 mmol and 0.02 mmol, respectively.

Example 3

A metallocene-supported catalyst was obtained through the same processes as in Example 1, except that, in Example 1, the third metallocene compound was used instead of the second metallocene compound, the amounts of the first metallocene compound and the third metallocene compound when producing the reaction solution 1 were changed to 0.04 mmol and 0.09 mmol, respectively, and the amounts of the first metallocene compound and the third metallocene compound when producing the reaction solution 2 were changed to 0.16 mmol and 0.21 mmol, respectively.

Example 4

A metallocene-supported catalyst was obtained through the same processes as in Example 1, except that, in Example 1, the third metallocene compound was used instead of the second metallocene compound, the amounts of the first metallocene compound and the third metallocene compound when producing the reaction solution 1 were changed to 0.16 mmol and 0.21 mmol, respectively, and the amounts of the first metallocene compound and the third metallocene compound when producing reaction solution 2 were changed to 0.04 mmol and 0.09 mmol, respectively.

Comparative Example 1

<Production of Co-Catalyst-Supported Support>

Into a glass reactor, 10 g of dried silica produced in the processes of Example 1, and then 72 g of a methylaluminoxane (MAO)/toluene solution (10 wt % in toluene) were put, and the mixture was gradually reacted with stirring for 1 hour at 40° C. After the reaction was completed, the mixture was washed several times with a sufficient amount of toluene until the unreacted aluminum compound was completely removed, and the remaining toluene was removed under reduced pressure at 50° C.

<Production of Metallocene-Supported Catalyst>

The first metallocene compound (0.2 mmol) produced in Production Example 1, the second metallocene compound (0.1 mmol) produced in Production Example 2, and 18 g of a methylaluminoxane (MAO)/toluene solution (10 wt % in toluene) were put into a glass reactor, and reacted with stirring for 2 hours at room temperature. Moreover, the co-catalyst-supported support (MAO/SiO$_2$) produced above and 10 mL toluene were put into another glass reactor, and stirred. A reactant of the first metallocene compound, the second metallocene compound, and the methylaluminoxane (MAO)/toluene solution was added thereto, and the mixture was reacted for 4 hours at 40° C. Thereafter, the reaction product was washed with a sufficient amount of toluene, and then dried under vacuum to obtain a metallocene-supported catalyst as a solid power.

Comparative Example 2

<Production of Metallocene-Supported Catalyst>

The first metallocene compound (0.2 mmol) produced in Production Example 1, the second metallocene compound (0.1 mmol) produced in Production Example 2, and 90 g of a methylaluminoxane (MAO)/toluene solution (10 wt % in toluene) were put into a glass reactor, and reacted with stirring for 2 hours at room temperature. Moreover, 10 g of dried silica produced in the processes of Example 1 was put into another glass reactor, 10 mL of toluene was added, and the mixture was stirred.

A reactant of the first metallocene compound, the second metallocene compound, and the methylaluminoxane (MAO)/toluene solution was added thereto, and the mixture was reacted for 4 hours at 40° C. Thereafter, the reaction product was washed with a sufficient amount of toluene, and then dried under vacuum to obtain a metallocene-supported catalyst as a solid power.

Comparative Example 3

<Production of Co-Catalyst-Supported Support>

Into a glass reactor, 20 g of dried silica produced in the processes of Example 1, and then 160 g of a methylaluminoxane (MAO)/toluene solution (10 wt % in toluene) were put, and gradually reacted with stirring for 1 hour at 40° C. After the reaction was completed, the mixture was washed several times with a sufficient amount of toluene until the unreacted aluminum compound was completely removed, and the remaining toluene was removed under reduced pressure at 50° C. As a result, 32 g of a co-catalyst-supported support (MAO/SiO$_2$) was obtained (content of Al in co-catalyst-supported support=17 wt %).

<Production of Metallocene-Supported Catalyst>

Into a glass reactor, 12 g of the co-catalyst-supported support (MAO/SiO$_2$) produced above and then 100 mL of toluene were put, and the mixture was stirred. A solution produced by dissolving, in toluene, the first metallocene compound (0.2 mmol) produced in Production Example 1 and the second metallocene compound (0.1 mmol) produced in Production Example 2 was added to the glass reactor, and the mixture reacted with stirring for 2 hours at 40° C. Thereafter, the reaction product was washed with a sufficient amount of toluene, and then dried under vacuum to obtain a metallocene-supported catalyst as a solid power.

Comparative Example 4

A metallocene-supported catalyst was obtained through the same processes as in Comparative Example 1, except that, in Comparative Example 1, the third metallocene compound was used instead of the second metallocene compound, the amounts of the first metallocene compound and the third metallocene compound were changed to 0.2 mmol and 0.3 mmol, respectively.

Comparative Example 5

A metallocene-supported catalyst was obtained through the same processes as in Comparative Example 2, except that, in Comparative Example 2, the third metallocene compound was used instead of the second metallocene compound, the amounts of the first metallocene compound and the third metallocene compound were changed to 0.2 mmol and 0.3 mmol, respectively.

Comparative Example 6

A metallocene-supported catalyst was obtained through the same processes as in Comparative Example 3, except that, in Comparative Example 3, the third metallocene compound was used instead of the second metallocene compound, the amounts of the first metallocene compound and the third metallocene compound were changed to 0.2 mmol and 0.3 mmol, respectively.

TABLE 1

|  | Supporting order | Supporting method | First supporting | | Second supporting | |
|---|---|---|---|---|---|---|
|  |  |  | MAO (wt %) | Transition metal compound (wt %) | MAO (wt %) | Transition metal compound (wt %) |
| Example 1 | SiO$_2$/(MAO + first metallocene compound)/(MAO + second metallocene compound) | Catalyst dividing supporting | 80 | 20 | 20 | 80 |
| Example 2 | SiO$_2$/(MAO + first metallocene compound)/(MAO + second metallocene compound) | Catalyst dividing supporting | 80 | 80 | 20 | 20 |
| Example 3 | SiO$_2$/MAO/(MAO + first metallocene compound + third metallocene compound) | Catalyst dividing supporting | 80 | 30 | 20 | 70 |
| Example 4 | SiO$_2$/(MAO + first metallocene compound + third metallocene compound) | Catalyst dividing supporting | 80 | 70 | 20 | 30 |
| Comparative Example 1 | SiO$_2$/MAO/(MAO + first metallocene compound + second metallocene compound) | Co-catalyst dividing supporting | 80 | 0 | 20 | 100 |
| Comparative Example 2 | SiO$_2$/(MAO + first metallocene compound + second metallocene compound) | Preactivation | 100 | 100 | 0 | 0 |
| Comparative Example 3 | SiO$_2$/MAO/(first metallocene compound + second metallocene compound) | Sequential supporting | 100 | 0 | 0 | 100 |
| Comparative Example 4 | SiO$_2$/MAO/(MAO + first metallocene compound + third metallocene compound) | Co-catalyst dividing supporting | 80 | 0 | 20 | 100 |
| Comparative Example 5 | SiO$_2$/(MAO + first metallocene compound + third metallocene compound) | Preactivation | 100 | 100 | 0 | 0 |
| Comparative Example 6 | SiO$_2$/MAO/(first metallocene compound + third metallocene compound) | Sequential supporting | 100 | 0 | 0 | 100 |

Polymerization Example 1

Polymerization of an olefin-based polymer was performed using each supported catalyst produced in Examples 1 and 2 and Comparative Examples 1 to 3.

The produced supported catalyst (60 mg) was quantified in a dry box, placed in a 50-mL glass bottle, then sealed with a rubber diaphragm, and taken out from the dry box to prepare a catalyst to be injected. Polymerization was performed in a 2-L autoclave high-pressure reactor equipped with a mechanical stirrer, capable of controlling a temperature, and useable at high pressure.

After putting 2 mL of triethylaluminum (1M in hexane) and then 0.6 kg of hexane into the reactor, the temperature was raised to 80° C. while stirring at 500 rpm. The supported catalyst (60 mg) prepared above and hexane (20 mL) were placed in a vial, the vial was put into a reactor, and 50 g of 1-hexene and 0.2 kg of hexane were put thereto. When the internal temperature of the reactor reached 80° C., the mixture was reacted for 3 hours while stirring at 500 rpm under ethylene pressure of 30 bar. After the reaction was completed, hexane was first removed from the obtained polymer through a filter, and then the resultant was dried in an oven at 80° C. for 3 hours to obtain an ethylene/1-hexene copolymer.

Polymerization Example 2

Polymerization of an olefin-based polymer was performed using each supported catalyst produced in Examples 3 and 4 and Comparative Examples 4 to 6.

The produced supported catalyst (60 mg) was quantified in a dry box, placed in a 50-mL glass bottle, then sealed with a rubber diaphragm, and taken out from the dry box to prepare a catalyst to be injected. Polymerization was performed in a 2-L autoclave high-pressure reactor equipped with a mechanical stirrer, capable of controlling a temperature, and useable at high pressure.

After putting 2 mL of triethylaluminum (1M in hexane) and then 1.2 kg of hexane into the reactor, the temperature was raised to 80° C. while stirring at 500 rpm. The supported catalyst (60 mg) prepared above and hexane (20 mL) were placed in a vial, and the vial was put into a reactor. When the internal temperature of the reactor reached 80° C., the mixture was reacted for 3 hours while stirring at 500 rpm under ethylene pressure of 9 bar. After the reaction was completed, hexane was first removed from the obtained polymer through a filter, and then the resultant was dried in an oven at 80° C. for 3 hours to obtain an ethylene polymer.

Analysis of Metallocene Compound Distribution

A metallocene compound distribution can be checked through the fact that there is a difference in atomic number between a metal center atom of metallocene and metal elements of MAO and SiO$_2$, and the brightness varies according to the difference in atomic number when the measurement with a high-angle annular dark-field scanning transmission electron microscope (HAADF-STEM) is performed.

Figure 2:
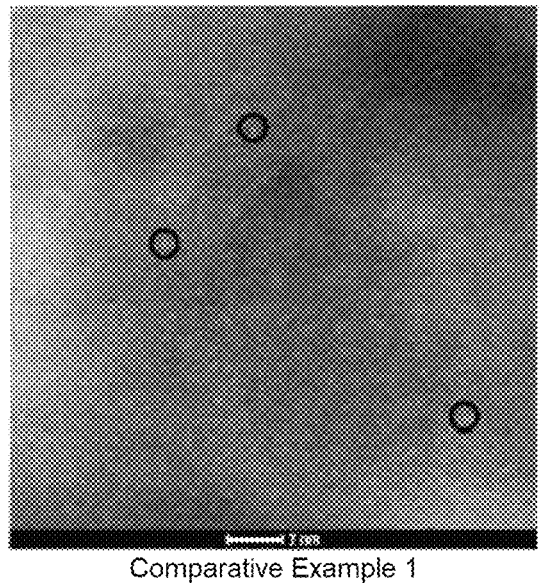
FIG. 2 is a scanning electron microscope (SEM) photograph of each metallocene-supported catalyst produced in Comparative Examples 1 to 3.
Figure 2:
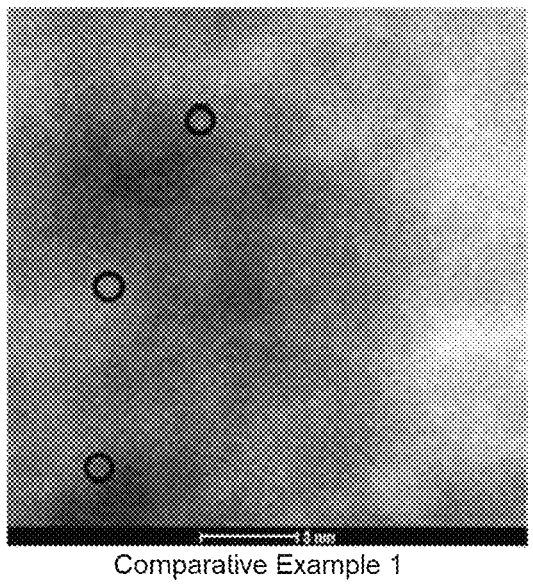
Figure 2:
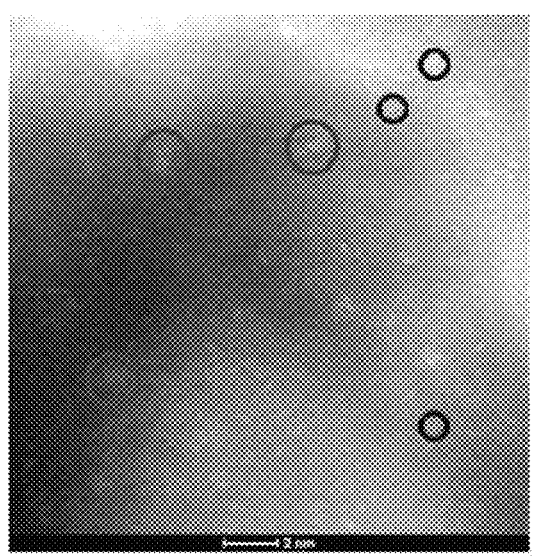

A high-angle annular dark-field scanning transmission electron microscope (HAADF-STEM) photograph was taken for each supported catalyst produced in Examples 1 and 2 and Comparative Examples 1 to 3, and the results thereof are shown in FIG. 1 and FIG. 2.

With reference to FIG. 1 and FIG. 2, it can be confirmed that in Examples 1 and 2 and Comparative Examples 1 and 2, the metallocene compounds are evenly distributed without being aggregated in the support.

On the other hand, in the case of Comparative Example 3, the form in which the metallocene compounds are aggregated can be confirmed. From these results, it could be confirmed that when sequential supporting was performed, the metallocene compounds were not evenly distributed and supported in a form of being aggregated.

Measurement of Average Ethylene Consumption Rate

An ethylene consumption rate was measured using a gas-phase polymerization reactor (2 L). After the catalyst was put, the reaction proceeded, and the pressure in the reactor was reduced as ethylene was consumed. By additionally supplying ethylene due to the reduced pressure, and measuring the flow rate with a mass flow controller, an ethylene consumption rate was measured. An average ethylene consumption rate indicates an ethylene consumption rate per hour until the corresponding reaction time.

Figure 3:
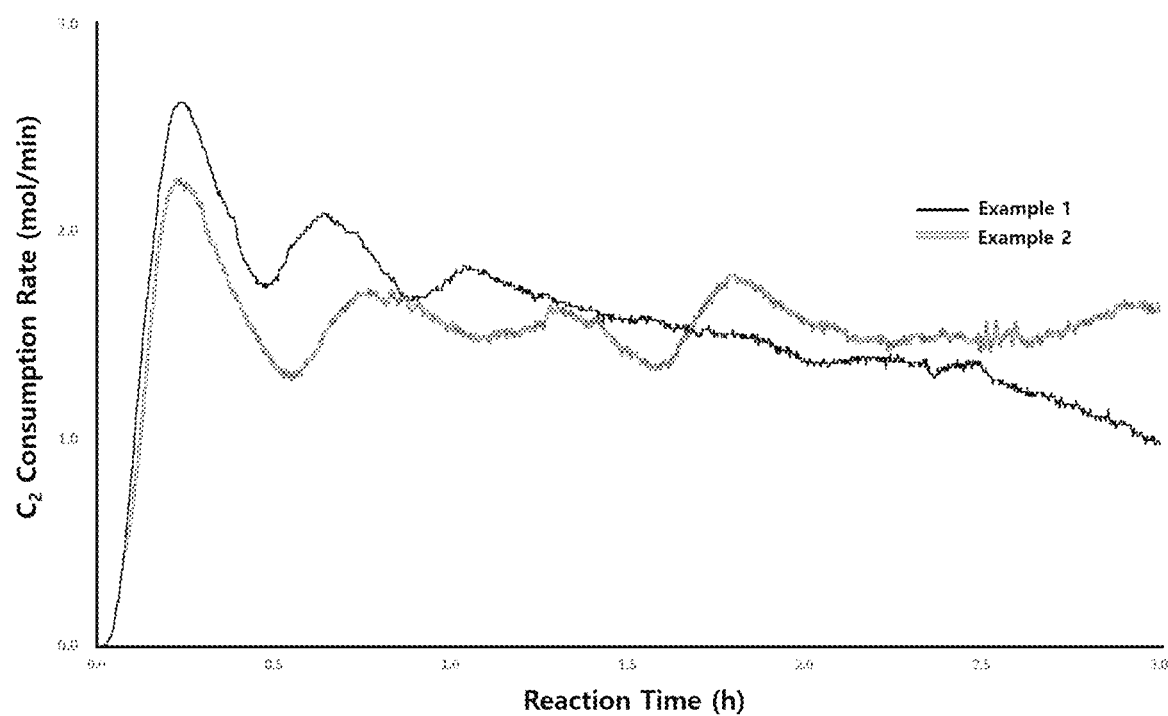
FIG. 3 is a graph illustrating ethylene consumption rates according to a reaction time when producing ethylene/1-hexene copolymers using the metallocene-supported catalysts produced in Examples 1 and 2.
Figure 4:
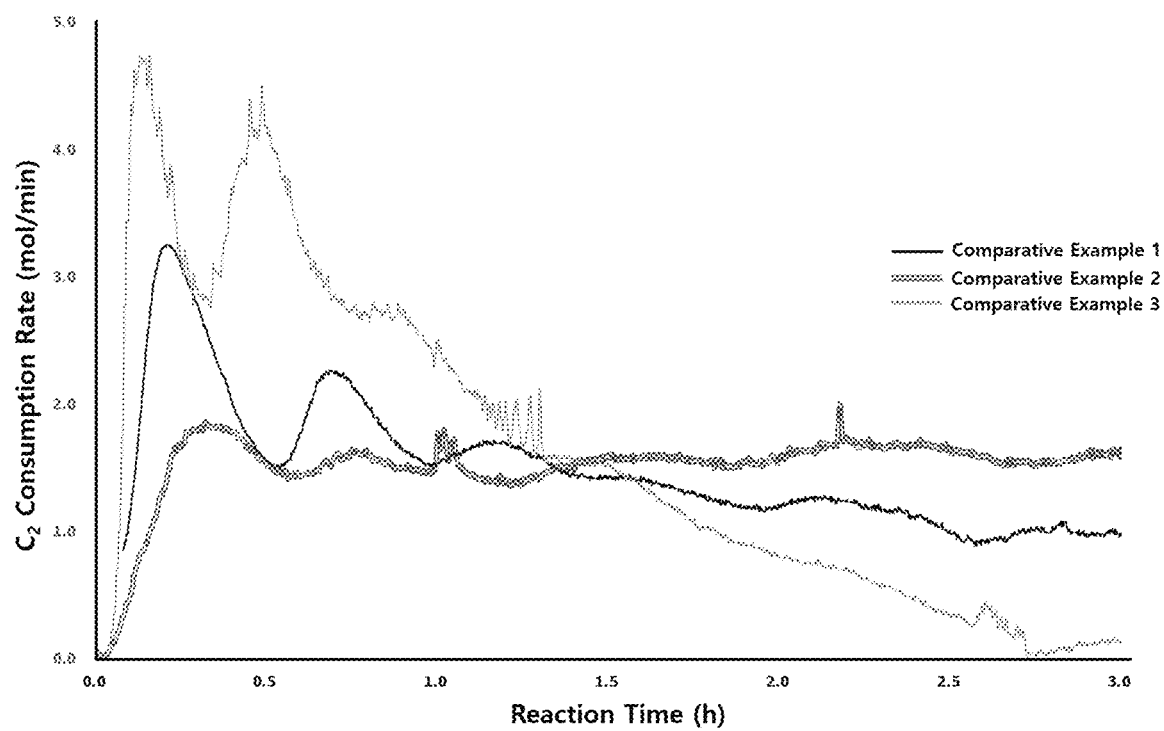
FIG. 4 is a graph illustrating ethylene consumption rates according to a reaction time when producing ethylene/1-hexene copolymers using the metallocene-supported catalysts produced in Comparative Examples 1 to 3.

The total ethylene consumptions and the average ethylene consumption rates are shown in Table 2 below and FIG. 3, and the total ethylene consumptions are shown in FIG. 4.

Bulk Density

A bulk density was calculated by filling a mess cylinder with a supported catalyst, measuring the weight thereof, and then dividing the measured weight by the volume of the mess cylinder.

The bulk density can be expressed by Equation 1 below.

Bulk density=weight (kg) of supported catalyst/volume ($m^3$) of supported catalyst   [Equation 1]

Measurement of Fine Powder Content

A fine powder content was measured by a method for separating polymer particles of 180 μm or less using a sieve and measuring the weight thereof, and the result was shown.

TABLE 2

| | Average $C_2$ consumption rate (mol/h) (Total $C_2$ consumption) | | | BD ($kg/m^3$) | Fine powder content (wt %, based on <180 μm) |
|---|---|---|---|---|---|
| | 1 h | 2 h | 3 h | | |
| Example 1 | 126 | 119 (237) | 108 (326) | 0.41 | 4.1 |
| Example 2 | 105 | 107 (214) | 106 (320) | 0.41 | 4.2 |
| Comparative Example 1 | 134 | 118 (235) | 103 (309) | 0.41 | 3.9 |
| Comparative Example 2 | 98 | 103 (205) | 106 (318) | 0.40 | 4.0 |
| Comparative Example 3 | 217 | 159 (318) | 115 (346) | Fouling | |

TABLE 3

| | Average $C_2$ consumption rate (mol/h) (Total $C_2$ consumption) | | | BD ($kg/m^3$) | Fine powder content (wt %, based on <180 μm) |
|---|---|---|---|---|---|
| | 1 h | 2 h | 3 h | | |
| Example 3 | 110 | 65.5 (131) | 47.6 (143) | 0.39 | 0.5 |
| Example 4 | 106 | 64.5 (129) | 48.3 (145) | 0.39 | 0.6 |
| Comparative Example 4 | 114 | 65.0 (130) | 46.7 (140) | 0.38 | 0.5 |
| Comparative Example 5 | 101 | 60.5 (121) | 46.0 (138) | 0.40 | 0.7 |
| Comparative Example 6 | 134 | 74.0 (148) | 50.0 (150) | 0.32 | 0.3 |

In Tables 2 and 3, BD indicates a bulk density.

In the gas-phase processes, a higher bulk density indicates higher process stability, and a smaller fine powder content indicates higher process stability. Moreover, the bulk density and the fine powder content are indirect indices indicating the morphology of particles, and the fact that the bulk densities and fine powder contents of Examples 1 and 2 and Comparative Examples 1 and 2 in Table 2 are similar to each other, and the bulk densities and fine powder contents of Examples 3 and 4 and Comparative Examples 4 and 5 in Table 3 are similar to each other means that the particle morphology, such as a shape and a size distribution, of the respective supported catalysts produced in Examples 1 and 2 and Comparative Examples 1 and 2, and in Examples 3 and 4 and Comparative Examples 4 and 5 was not significantly changed.

Figure 6:
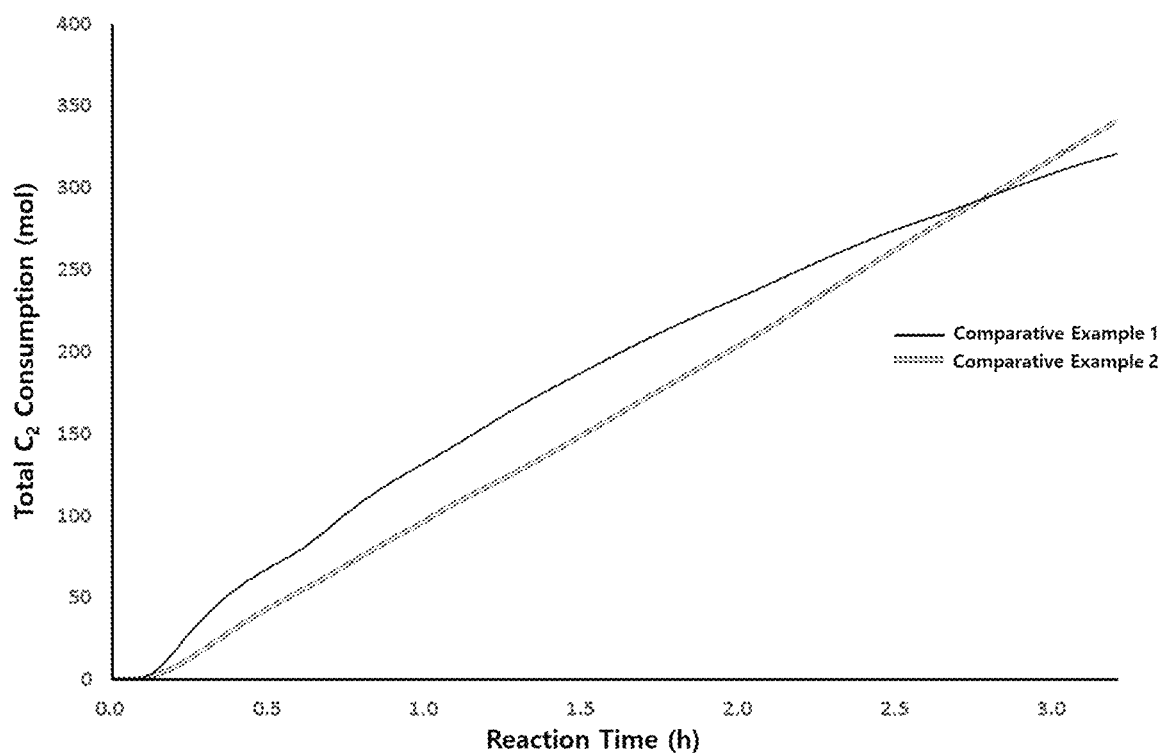
FIG. 6 is a graph illustrating total ethylene consumptions according to a reaction time when producing the ethylene/1-hexene copolymers using the metallocene-supported catalysts produced in Comparative Examples 1 to 2.

There is a difference in the time during which the put catalyst remains in the reactor, according to the characteristics (catalyst residence time) of the reactor. With reference to Table 2 and FIGS. 4 and 6, it can be confirmed that the average ethylene consumption rate in the first 1-hour section was high in Comparative Example 3, but the average ethylene consumption rate of Comparative Example 3 was decreased over time. Moreover, in the case of Comparative Example 3, the total ethylene consumption was large, the initial reactivity was high, but the reaction rate was not controlled, and thus fouling occurred. When fouling occurs, there is the problem in that the fouling adversely affects the inside of the reactor to cause shut-down. That is, the reactivity is required to be controlled, and the problem can be solved by achieving controlled reactivity through the improvement in the catalyst supporting method.

The catalyst residence times in the gas-phase processes are determined according to each process, and there is the advantage that the put amount of the catalyst can be reduced when the maximum catalytic reactivity is exhibited at the catalyst residence time in the process. Therefore, it can be said that a technique capable of controlling the catalyst expression is required.

Figure 5:
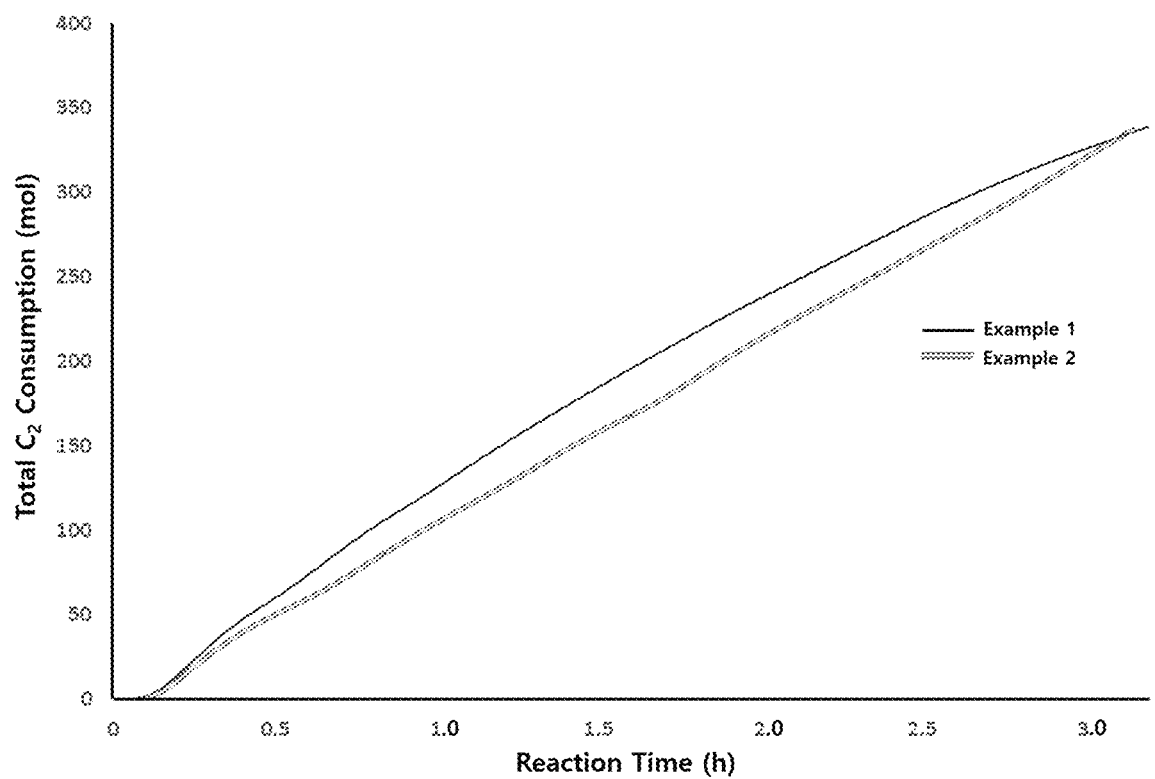
FIG. 5 is a graph illustrating total ethylene consumptions according to a reaction time when producing the ethylene/1-hexene copolymers using the metallocene-supported catalysts produced in Examples 1 and 2.

Examples 1 and 2 are examples in which when the catalyst was supported, the catalyst expression time was controlled by controlling the ratio of the catalyst, and with reference to Table 2 and FIGS. 3 and 5, it can be confirmed that in Example 1, the average ethylene consumption rate was gradually decreased over time while showing a large total ethylene consumption, and in Example 2, the average ethylene consumption rate was maintained constant even over time while showing a large total ethylene consumption. In Example 1, the average ethylene consumption rate for the first 1 hour was higher than that of Example 2, so that the total ethylene consumption and average ethylene consumption rate up to 2 hours showed a larger value than those of Example 2. It can be considered that Example 1 is suitable for a catalyst residence time of 2 hours to 3 hours, and Example 2 is suitable for a process with a catalyst residence time of 3 hours or longer.

Meanwhile, in Comparative Example 1 and Comparative Example 2, the total ethylene consumption up to 3 hours showed a smaller value than those of Examples 1 and 2. Comparative Example 1 exhibits a high average ethylene consumption rate for the first 1 hour, and thus would be advantageous for a short reaction with a catalyst residence time of shorter than 1 hour, and Comparative Example 2 exhibits a large total ethylene consumption, as can be seen in FIG. 4, with the increase over time in the average ethylene consumption rate, and thus would be advantageous for a long reaction. However, in the case of conventional reactions in the related art, such as Comparative Examples 1 and 2, the catalyst expression time cannot be controlled, and thus it is difficult to produce a catalyst exhibiting a constant ethylene consumption rate as in Example 2.

Figure 8:
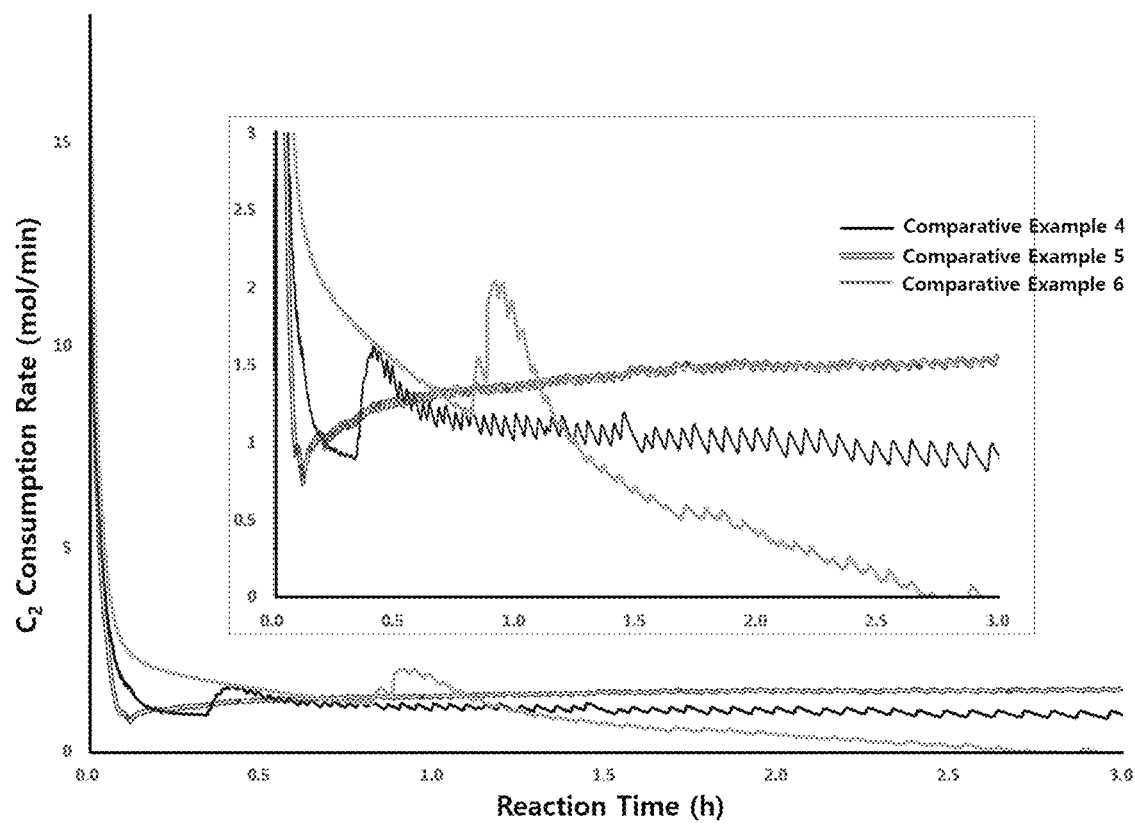
FIG. 8 is a graph illustrating ethylene consumption rates according to a reaction time when producing ethylene polymers using metallocene-supported catalysts produced in Comparative Examples 4 to 6.
Figure 10:
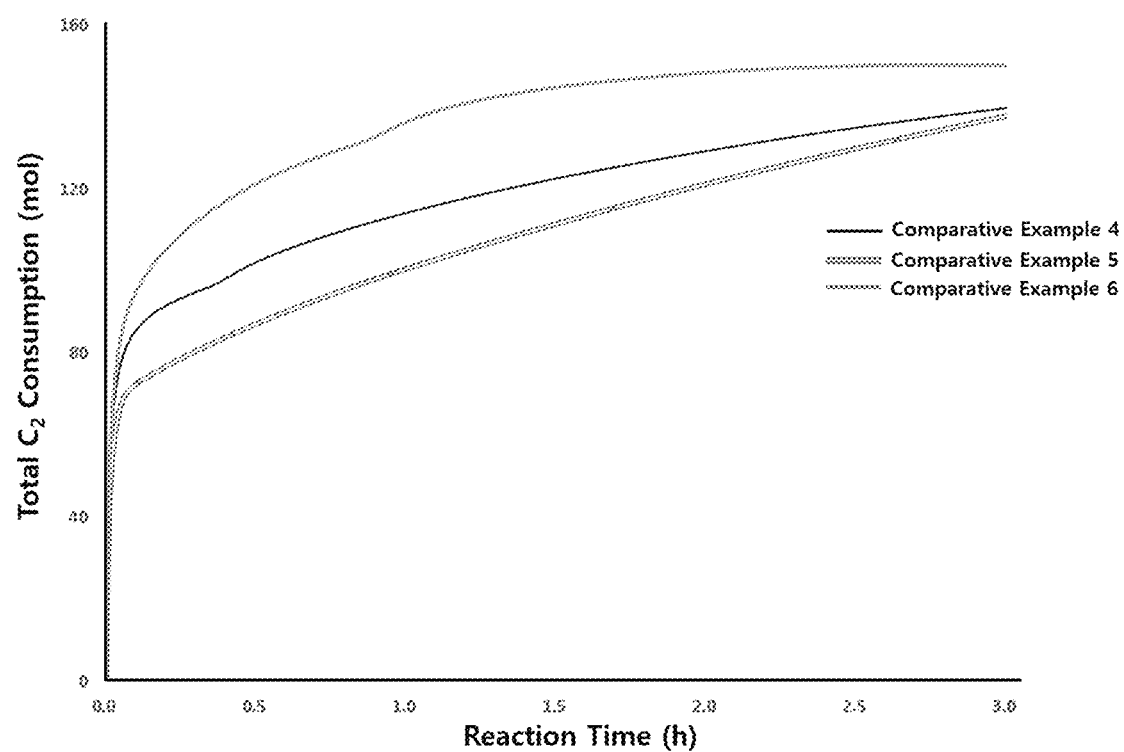
FIG. 10 is a graph illustrating total ethylene consumptions according to a reaction time when producing the ethylene polymers using the metallocene-supported catalysts produced in Comparative Examples 4 to 6.

With reference to Table 3 and FIGS. 8 and 10, it can be confirmed that the average ethylene consumption rate in the first 1-hour section was high in Comparative Example 6, but the average ethylene consumption rate of Comparative Example 6 was decreased over time. In the case of Comparative Example 6, unlike Comparative Example 3, fouling did not occur, but the reaction rate was similarly not controlled.

Figure 7:
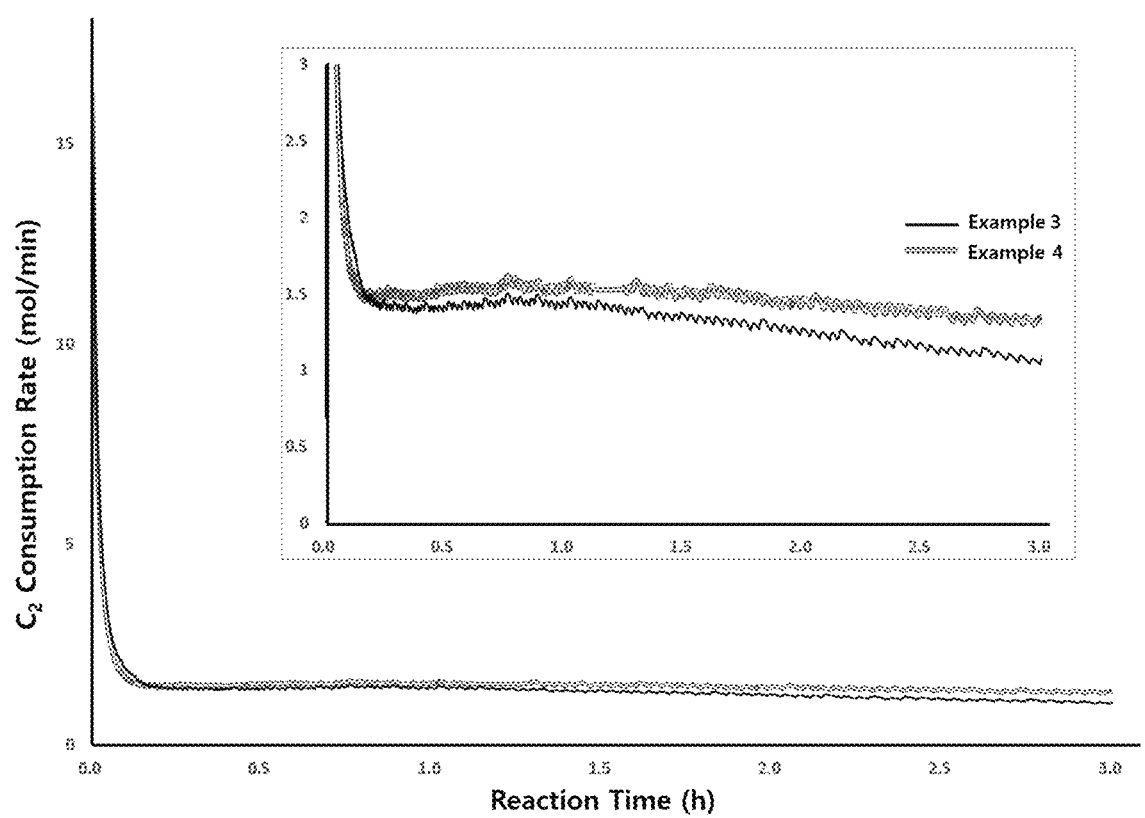
FIG. 7 is a graph illustrating ethylene consumption rates according to a reaction time when producing ethylene polymers using metallocene-supported catalysts produced in Examples 3 and 4.
Figure 9:
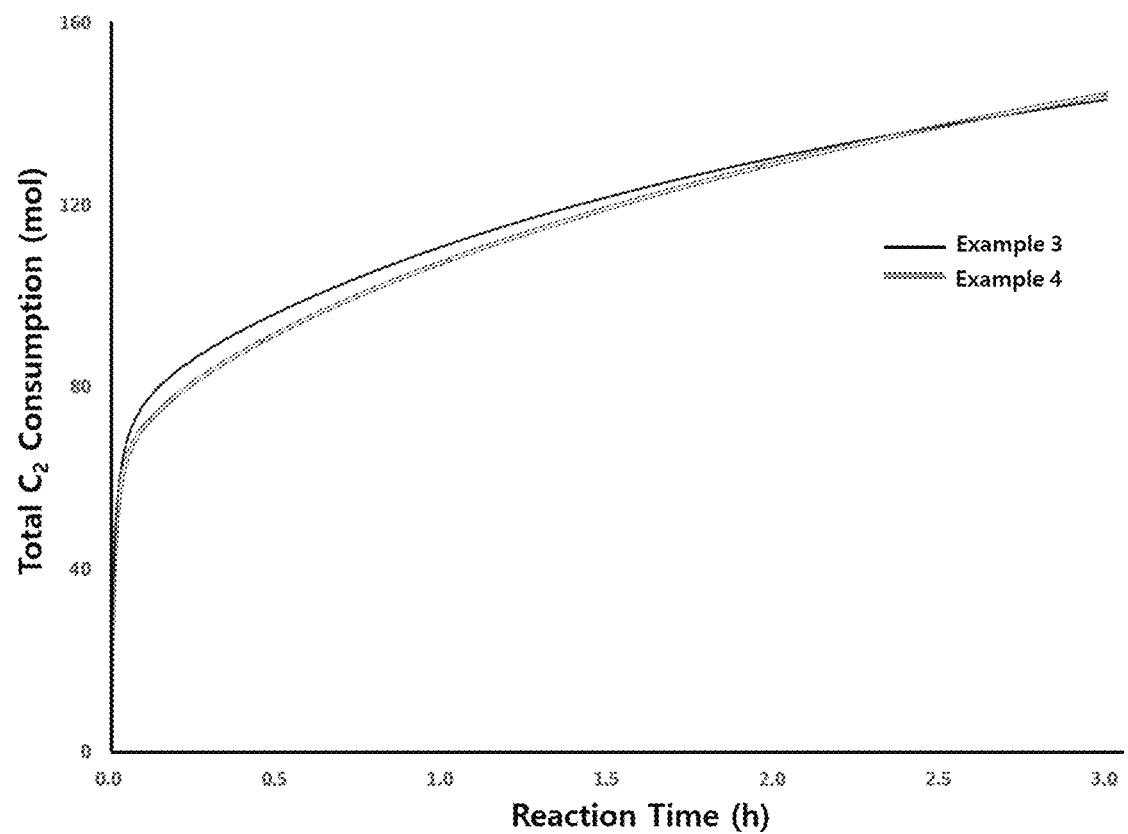
FIG. 9 is a graph illustrating total ethylene consumptions according to a reaction time when producing the ethylene polymers using the metallocene-supported catalysts produced in Examples 3 and 4.

Examples 3 and 4 are examples in which when the catalyst was supported, the catalyst expression time was controlled by controlling the ratio of the catalyst, and with reference to Table 3 and FIGS. 7 and 9, it can be confirmed that in Examples 3 and 4, the average ethylene consumption rate was gradually decreased over time while showing a large total ethylene consumption, and in Example 4, the average ethylene consumption rate was maintained relatively constant. It can be considered that Example 3 is suitable for a catalyst residence time of 1 hour to 2 hours, and Example 4 is suitable for a process with a catalyst residence time of 3 hours or longer.

From these results, it could be confirmed that the method for producing a metallocene-supported catalyst according to the present invention can control the catalyst expression time by controlling the catalyst supporting ratio, and thus can produce a metallocene-supported catalyst exhibiting a suitable catalyst residence time according to the process.

The invention claimed is:

1. A method for producing a metallocene-supported catalyst, the method comprising:
   (1) a step of producing a reaction solution 1 by reacting one or more metallocene compounds with one or more first co-catalyst compounds;
   (2) a step of performing supporting by mixing a support with the reaction solution 1 to obtain a supporting material;
   (3) a step of producing a reaction solution 2 by reacting one or more metallocene compounds, which are the same as or different from the metallocene compounds used in the step (1), with one or more second co-catalyst compounds; and
   (4) a step of mixing the reaction solution 2 with the supporting material of the step (2),
   wherein a weight ratio of the first co-catalyst compounds used in the step (1) to the second co-catalyst compounds used in the step (3) is 2:1 to 6:1.

2. The method for producing a metallocene-supported catalyst of claim 1, wherein a weight ratio of the metallocene compounds used in the step (1) to the metallocene compounds used in the step (3) is 6:1 to 1:6.

3. The method for producing a metallocene-supported catalyst of claim 1, wherein the metallocene compounds used in the step (1) and the metallocene compounds used in the step (3) each include at least one of a first metallocene compound, a second metallocene compound, or a third metallocene compound.

4. The method for producing a metallocene-supported catalyst of claim 3, wherein the first metallocene compound is a metallocene compound represented by Formula 1 below:

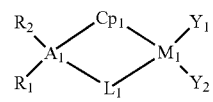

[Formula 1]

in Formula 1,
Cp$_1$ and L$_1$ are each independently a cyclic structure selected from the group consisting of cyclopentadienyl, indenyl, 4,5,6,7-tetrahydro-1H-indenyl, fluorenyl, 3H-benzo[b]cyclopenta[d]thiophene, and 1H-benzo[b]cyclopenta[d]thiophene, and optionally one or more hydrogens in the cyclic structure are each independently substituted with a substituent selected from alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms;
Y$_1$ and Y$_2$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;
A$_1$ is carbon, silicon, or germanium;
R$_1$ and R$_2$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and
M$_1$ is a transition metal of group 4.

5. The method for producing a metallocene-supported catalyst of claim 4, wherein in Formula 1,
Cp$_1$ is cyclopentadienyl, indenyl, 4,5,6,7-tetrahydro-1H-indenyl, or fluorenyl, in each of which optionally one or more hydrogens are each independently substituted with a substituent selected from alkyl having 1 to 12 carbon atoms, alkoxy having 1 to 12 carbon atoms, alkoxyalkyl having 2 to 12 carbon atoms, or aryl having 6 to 12 carbon atoms;
L$_1$ is cyclopentadienyl, indenyl, or 4,5,6,7-tetrahydro-1H-indenyl, in each of which optionally one or more hydrogens are each independently substituted with a substituent selected from alkyl having 1 to 12 carbon atoms, alkoxy having 1 to 12 carbon atoms, alkoxyalkyl having 2 to 12 carbon atoms, or aryl having 6 to 12 carbon atoms;
Y$_1$ and Y$_2$ are the same as or different from each other, and are each independently halogen, alkyl having 1 to 12 carbon atoms, alkenyl having 2 to 12 carbon atoms, or aryl having 6 to 12 carbon atoms;
A$_1$ is carbon, silicon, or germanium;
R$_1$ and R$_2$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and $M_1$ is Ti, Zr, or Hf.

6. The method for producing a metallocene-supported catalyst of claim 4,
wherein in Formula 1,
$Cp_1$ is indenyl or 4,5,6,7-tetrahydro-1H-indenyl, in each of which optionally one or more hydrogens are each independently substituted with a substituent selected from alkyl having 1 to 12 carbon atoms or aryl having 6 to 12 carbon atoms;
$L_1$ is cyclopentadienyl, in which optionally one or more hydrogens are each independently substituted with alkyl having 1 to 12 carbon atoms;
$Y_1$ and $Y_2$ are the same as or different from each other, and are each independently halogen or alkyl having 1 to 12 carbon atoms;
$A_1$ is carbon or silicon;
$R_1$ and $R_2$ are the same as or different from each other, and are each independently hydrogen, alkyl having 1 to 20 carbon atoms, alkoxy having 1 to 20 carbon atoms, or alkoxyalkyl having 2 to 20 carbon atoms; and
$M_1$ is Ti or Zr.

7. The method for producing a metallocene-supported catalyst of claim 3, wherein the second metallocene compound is a metallocene compound represented by Formula 2 below:

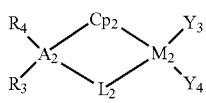

[Formula 2]

in Formula 2,
$Cp_2$ and $L_2$ are each independently a cyclic structure selected from the group consisting of cyclopentadienyl, indenyl, 4,5,6,7-tetrahydro-1H-indenyl, fluorenyl, 3H-benzo[b]cyclopenta[d]thiophene, and 1H-benzo[b]cyclopenta[d]thiophene, and optionally one or more hydrogens in the cyclic structure are each independently substituted with a substituent selected from alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms;
$Y_3$ and $Y_4$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;
$A_2$ is carbon, silicon, or germanium;
$R_3$ and $R_4$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and
$M_2$ is a transition metal of group 4.

8. The method for producing a metallocene-supported catalyst of claim 7,
wherein in Formula 2,
$Cp_2$ is cyclopentadienyl, indenyl, 4,5,6,7-tetrahydro-1H-indenyl, or fluorenyl, in each of which optionally one or more hydrogens are each independently substituted with a substituent selected from alkyl having 1 to 12 carbon atoms, alkoxy having 1 to 12 carbon atoms, alkoxyalkyl having 2 to 12 carbon atoms, aryl having 6 to 12 carbon atoms, alkylaryl having 7 to 20 carbon atoms, or arylalkyl having 7 to 20 carbon atoms;
$L_2$ is cyclopentadienyl, indenyl, or 4,5,6,7-tetrahydro-1H-indenyl, in each of which optionally one or more hydrogens are each independently substituted with a substituent selected from alkyl having 1 to 12 carbon atoms, alkoxy having 1 to 12 carbon atoms, alkoxyalkyl having 2 to 12 carbon atoms, or aryl having 6 to 12 carbon atoms;
$Y_3$ and $Y_4$ are the same as or different from each other, and are each independently halogen, alkyl having 1 to 12 carbon atoms, alkenyl having 2 to 12 carbon atoms, or aryl having 6 to 12 carbon atoms;
$A_2$ is carbon, silicon, or germanium;
$R_3$ and $R_4$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and
$M_2$ is Ti, Zr, or Hf.

9. The method for producing a metallocene-supported catalyst of claim 7,
wherein in Formula 2,
$Cp_2$ is indenyl or 4,5,6,7-tetrahydro-1H-indenyl, in each of which optionally one or more hydrogens are each independently substituted with a substituent selected from alkyl having 1 to 12 carbon atoms, aryl having 6 to 12 carbon atoms, or alkylaryl having 7 to 20 carbon atoms;
$L_2$ is cyclopentadienyl, in which optionally one or more hydrogens are each independently substituted with alkyl having 1 to 12 carbon atoms;
$Y_3$ and $Y_4$ are the same as or different from each other, and are each independently halogen or alkyl having 1 to 12 carbon atoms;
$A_2$ is carbon or silicon;
$R_3$ and $R_4$ are the same as or different from each other, and are each independently hydrogen, alkyl having 1 to 20 carbon atoms, alkoxy having 1 to 20 carbon atoms, or alkoxyalkyl having 2 to 20 carbon atoms; and
$M_2$ is Ti or Zr.

10. The method for producing a metallocene-supported catalyst of claim 3, wherein the third metallocene compound is a metallocene compound represented by Formula 3 below:

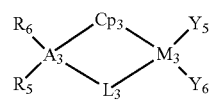

[Formula 3]

in Formula 3,
$Cp_3$ is a cyclic structure selected from the group consisting of 6H-cyclopenta[b]thiophene, 4H-cyclopenta[b]thiophene, 3H-benzo[b]cyclopenta[d]thiophene, and 1H-benzo[b]cyclopenta[d]thiophene, and optionally one or more hydrogens in the cyclic structure are each independently substituted with a substituent selected from alkyl having 1 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms;

$L_3$ is —$NR_a$—, and Ra is hydrogen or alkyl having 1 to 20 carbon atoms;

$Y_5$ and $Y_6$ are the same as or different from each other, and are each independently halogen, alkyl having 1 to 20 carbon atoms, alkenyl having 2 to 20 carbon atoms, aryl having 6 to 20 carbon atoms, alkylaryl having 7 to 20 carbon atoms, or arylalkyl having 7 to 20 carbon atoms;

$A_3$ is carbon, silicon, or germanium;

$R_5$ and $R_6$ are the same as or different from each other, and are each independently hydrogen, alkyl having 1 to 20 carbon atoms, alkenyl having 2 to 20 carbon atoms, alkoxy having 1 to 20 carbon atoms, alkoxyalkyl having 2 to 20 carbon atoms, aryl having 6 to 20 carbon atoms, alkylaryl having 7 to 20 carbon atoms, or arylalkyl having 7 to 20 carbon atoms; and $M_3$ is a transition metal of group 4.

11. The method for producing a metallocene-supported catalyst of claim 10,
wherein in Formula 3,
Cp$_3$ is a cyclic structure selected from the group consisting of 6H-cyclopenta[b]thiophene and 3H-benzo[b]cyclopenta[d]thiophene, and optionally one or more hydrogens in the cyclic structure are each independently substituted with a substituent selected from alkyl having 1 to 12 carbon atoms, aryl having 6 to 12 carbon atoms, or alkylaryl having 7 to 20 carbon atoms;

$L_3$ is —$NR_a$—, and Ra is alkyl having 1 to 12 carbon atoms;

$Y_5$ and $Y_6$ are the same as or different from each other, and are each independently halogen or alkyl having 1 to 12 carbon atoms;

$A_3$ is carbon or silicon;

$R_5$ and $R_6$ are the same as or different from each other, and are each independently hydrogen, alkyl having 1 to 20 carbon atoms, alkoxy having 1 to 20 carbon atoms, or alkoxyalkyl having 2 to 20 carbon atoms; and $M_3$ is Ti or Zr.

12. The method for producing a metallocene-supported catalyst of claim 3, wherein the first metallocene compound includes a metallocene compound represented by Formula 4 below, the second metallocene compound includes a metallocene compound represented by Formula 5 below, and the third metallocene compound includes a metallocene compound represented by Formula 6 below:

[Formula 4]

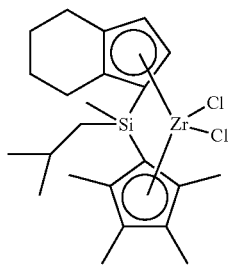

[Formula 5]

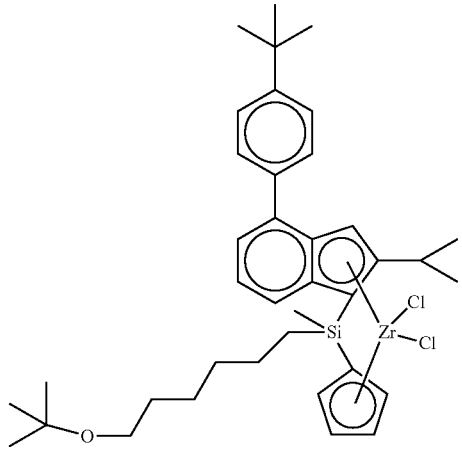

[Formula 6]

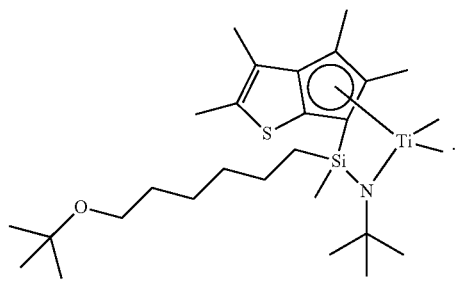

13. The method for producing a metallocene-supported catalyst of claim 1, wherein the first co-catalyst compounds used in the step (1) and the second co-catalyst compounds used in the step (3) include an alkylaluminoxane compound.

14. The method for producing a metallocene-supported catalyst of claim 1, wherein the first co-catalyst compounds and the second co-catalyst compounds include one or more among compounds represented by Formulae 7 to 9 below:

—[Al(R$_7$)—O]$_a$—   [Formula 7]

D(R$_7$)$_3$   [Formula 8]

[L-H]$^+$[Z(A)$_4$]$^-$ or [L]$^+$[Z(A)$_4$]$^-$   [Formula 9]

in the formulae,
R$_7$'s are each independently a halogen radical, a hydrocarbyl radical having 1 to 20 carbon atoms, or a hydrocarbyl radical which has 1 to 20 carbon atoms and is substituted with halogen; and a is an integer of 2 or more;

D is aluminum or boron; and

L is a neutral or cationic Lewis base; H is a hydrogen atom; Z is an element of group 13; A's are each independently aryl having 6 to 20 carbon atoms or alkyl having 1 to 20 carbon atoms, in each of which optionally one or more hydrogens are independently substituted with a substituent selected from halogen, hydrocarbyl having 1 to 20 carbon atoms, alkoxy having 1 to 20 carbon atoms, or aryloxy having 6 to 20 carbon atoms.

15. A method for producing an olefin-based polymer, the method comprising a step for polymerizing an olefin monomer in the presence of a metallocene-supported catalyst produced by the method according to claim 1.

* * * * *